United States Patent
O'Hare et al.

(10) Patent No.: US 9,215,218 B2
(45) Date of Patent: Dec. 15, 2015

(54) SYSTEMS AND METHODS FOR SECURE WORKGROUP MANAGEMENT AND COMMUNICATION

(71) Applicant: Security First Corp., Rancho Santa Margarita, CA (US)

(72) Inventors: Mark S. O'Hare, Coto De Caza, CA (US); Rick L. Orsini, Flower Mound, TX (US); Stephen C. Bono, Baltimore, MD (US); Matthew D. Green, Baltimore, MD (US); Gabriel D. Landau, Baltimore, MD (US); Roger S. Davenport, Campbell, TX (US)

(73) Assignee: Security First Corp., Rancho Santa Margarita, CA (US)

(*) Notice: Subject to any disclaimer, the term of this patent is extended or adjusted under 35 U.S.C. 154(b) by 0 days.

(21) Appl. No.: 14/181,257

(22) Filed: Feb. 14, 2014

(65) Prior Publication Data

US 2014/0281542 A1    Sep. 18, 2014

Related U.S. Application Data

(63) Continuation of application No. 12/391,025, filed on Feb. 23, 2009, now Pat. No. 8,656,167.

(60) Provisional application No. 61/147,961, filed on Jan. 28, 2009, provisional application No. 61/066,699, filed on Feb. 22, 2008.

(51) Int. Cl.
*H04L 29/06*    (2006.01)

(52) U.S. Cl.
CPC .......... *H04L 63/0428* (2013.01); *H04L 63/061* (2013.01); *H04L 63/065* (2013.01); *H04L 63/067* (2013.01); *H04L 63/0846* (2013.01); *H04L 63/068* (2013.01)

(58) Field of Classification Search
CPC ... H04L 9/0836; H04L 63/065; H04L 63/104; H04L 9/0833
USPC ......................................................... 713/170
See application file for complete search history.

(56) References Cited

U.S. PATENT DOCUMENTS

| 5,239,659 A | 8/1993 | Rudeseal et al. |
|---|---|---|
| 6,049,878 A | 4/2000 | Caronni et al. |

(Continued)

FOREIGN PATENT DOCUMENTS

| CN | 1459994 A | 12/2003 |
|---|---|---|
| CN | 1929373 A | 3/2007 |

(Continued)

OTHER PUBLICATIONS

Decleene et al., "Secure group communications for wireless networks," MILCOM 2001 Proceedings, Communications for Network-Centric Operations: Creating the Information Force; IEEE, US, vol. 1, Oct. 28, 2001, pp. 113-117.

(Continued)

*Primary Examiner* — Jason K Gee
(74) *Attorney, Agent, or Firm* — Ropes & Gray LLP

(57) ABSTRACT

A secure data parser is provided that may be integrated into any suitable system for securely storing and communicating data. The secure data parser may split or share a data set into multiple portions that are stored or communicated distinctly. Encryption of the original data, the portions of data, or both may be employed for additional security. The secure data parser may be used to protect data in motion by splitting an original data set into portions of data that may be communicated using one or more communications paths. Secure workgroup communication is supported through the secure distribution and management of a workgroup key for use with the secure data parser.

24 Claims, 22 Drawing Sheets

(56) References Cited

U.S. PATENT DOCUMENTS

| | | | |
|---|---|---|---|
| 6,118,874 | A | 9/2000 | Okamoto et al. |
| 6,295,361 | B1 | 9/2001 | Kadansky et al. |
| 6,473,858 | B1 * | 10/2002 | Shimomura et al. ........... 713/150 |
| 6,519,262 | B1 | 2/2003 | Stephens et al. |
| 6,662,299 | B1 | 12/2003 | Price, III |
| 6,853,988 | B1 | 2/2005 | Dickinson et al. |
| 6,947,557 | B1 * | 9/2005 | Megiddo et al. ................ 380/30 |
| 7,206,250 | B2 | 4/2007 | Groux |
| 7,234,063 | B1 | 6/2007 | Baugher et al. |
| 7,260,724 | B1 | 8/2007 | Dickinson et al. |
| 7,499,905 | B2 | 3/2009 | Jaschek et al. |
| 7,535,905 | B2 | 5/2009 | Narayanan et al. |
| 7,730,543 | B1 | 6/2010 | Nath |
| 7,756,792 | B2 | 7/2010 | Hughes |
| 8,156,408 | B2 | 4/2012 | Tsutsumi et al. |
| 8,189,769 | B2 | 5/2012 | Ramasamy et al. |
| 8,307,443 | B2 | 11/2012 | Wang et al. |
| 8,656,167 | B2 | 2/2014 | Bono et al. |
| 8,898,464 | B2 | 11/2014 | Bono et al. |
| 2003/0056093 | A1 * | 3/2003 | Huitema et al. ............... 713/156 |
| 2003/0126434 | A1 | 7/2003 | Lim et al. |
| 2005/0050004 | A1 | 3/2005 | Sheu et al. |
| 2005/0071631 | A1 * | 3/2005 | Langer ........................... 713/156 |
| 2005/0220095 | A1 * | 10/2005 | Narayanan et al. ........... 370/389 |
| 2006/0168446 | A1 * | 7/2006 | Ahonen et al. ................ 713/163 |
| 2006/0232826 | A1 | 10/2006 | Bar-El |
| 2007/0253376 | A1 * | 11/2007 | Bonta et al. ................... 370/338 |
| 2008/0072035 | A1 | 3/2008 | Johnson et al. |
| 2013/0268760 | A1 | 10/2013 | Bono et al. |
| 2014/0281542 | A1 | 9/2014 | Bono et al. |

FOREIGN PATENT DOCUMENTS

| | | |
|---|---|---|
| CN | 101030849 A | 9/2007 |
| EP | 2 163 067 A2 | 3/2010 |
| EP | 2 416 541 A1 | 2/2012 |
| EP | 2 651 100 A1 | 10/2013 |

OTHER PUBLICATIONS

Menezes et al., "Handbook of Applied Cryptography, Key Management Techniques," pp. 543-590, XP002246921, section 13.5.2(i) (Jan. 1, 1996).

Menezes et al., "Handbook of Applied Cryptography, Key Establishment Protocols," pp. 489-541, XP002304953, section 12.7 (Jan. 1, 1997).

"Webconverger 2.30 CD versions and above," Jul. 26, 2010, XP55025541, Retrieved from the Internet: URL:http://web.archive.org/web/20100726105024/http://webconverger.org/homepage/[retrieved on Apr. 24, 2012].

Waldvogel et al, "The VersaKey Framework: Versatile Group Key Management," IEEE Journal on Selected Areas in Communications, IEEE Service Center, Piscataway, vol. 17, No. 9 XP011055017, ISSN: 0733-8716 (Sep. 1, 1999).

Naor et al., "Revocation and Tracing Schemes for Stateless Receivers," International Association for Cryptologic Research, 20011205:104841; Jul. 2001, pp. 1-34.

* cited by examiner

SYSTEMS AND METHODS FOR SECURE WORKGROUP MANAGEMENT AND COMMUNICATION

CROSS-REFERENCE TO RELATED APPLICATIONS

This is a continuation application of U.S. patent application Ser. No. 12/391,025 filed Feb. 23, 2009, which claims the benefit of U.S. Provisional Patent Application Nos. 61/066, 699, entitled "Systems and Methods for Secure Workgroup Management" filed Feb. 22, 2008, and 61/147,961, entitled "Workgroup Key Management and Distribution" filed Jan. 28, 2009. Each of these prior applications are incorporated by reference herein in their entireties.

FIELD OF THE INVENTION

The present invention relates in general to improved systems and methods for securing data in motion (i.e., data being transferred from one location to another) within a workgroup. The systems and methods described herein may be used in conjunction with other systems and methods described in commonly-owned U.S. Pat. No. 7,391,865 and commonly-owned U.S. patent application Ser. No. 10/458,928, filed Jun. 11, 2003, Ser. No. 11/258,839, filed Oct. 25, 2005, Ser. No. 11/602,667, filed Nov. 20, 2006, Ser. No. 11/983,355, filed Nov. 7, 2007, Ser. No. 11/999,575, filed Dec. 5, 2007, Ser. No. 12/209,703, filed Sep. 12, 2008, and Ser. No. 12/349,897, filed Jan. 7, 2009, all of which are hereby incorporated by reference herein in their entireties.

BACKGROUND OF THE INVENTION

In today's society, individuals and businesses conduct an ever-increasing amount of activities on and over computer systems. These computer systems, including proprietary and non-proprietary computer networks, are often storing, archiving, and transmitting all types of sensitive information. Thus, an ever-increasing need exists for ensuring data stored and transmitted over these systems cannot be read or otherwise compromised.

One common solution for securing computer systems is to provide login and password functionality. However, password management has proven to be quite costly with a large percentage of help desk calls relating to password issues. Moreover, passwords provide little security in that they are generally stored in a file susceptible to inappropriate access, through, for example, brute-force attacks.

Another solution for securing computer systems is to provide cryptographic infrastructures. Cryptography, in general, refers to protecting data by transforming, or encrypting, it into an unreadable format. Only those who possess the key(s) to the encryption can decrypt the data into a useable format. Cryptography may be used to identify users, e.g., authentication, to allow access privileges, e.g., authorization, to create digital certificates and signatures, and the like. One popular cryptography system is a public key system that uses two keys, a public key known to everyone and a private key known only to the individual or business owner thereof. Generally, the data encrypted with one key is decrypted with the other and neither key is recreatable from the other.

Unfortunately, even the foregoing typical public-key cryptographic systems are still highly reliant on the user for security. For example, cryptographic systems issue the private key to the user, for example, through the user's browser. Unsophisticated users then generally store the private key on a hard drive accessible to others through an open computer system, such as, for example, the Internet. On the other hand, users may choose poor names for files containing their private key, such as, for example, "key." The result of the foregoing and other acts is to allow the key or keys to be susceptible to compromise.

Traditional solutions for securing data in motion also fail to provide robust and secure workgroup support. For example, the members of a workgroup may wish to communicate securely (e.g., in a private and authenticated manner) with other workgroup members over one or more secure channels. Typical secure workgroup communication protocols based on pre-shared workgroup encryption keys, public key broadcast encryption, and the like often become unstable and insecure because of insecure and inefficient management and distribution of the shared workgroup key. In addition, these secure workgroup communication protocols generally include only limited workgroup client revocation support. For example, the communication privileges of any one workgroup member generally cannot be efficiently revoked, for example, after compromise of the member's identity or shared workgroup key, or after the workgroup member leaves a workgroup. Moreover, with traditional approaches, there is generally no way to quickly and efficiently renew a workgroup security mechanism either on-demand, periodically, or automatically after the communication privileges of any one workgroup member has been revoked (or the workgroup member leaves the workgroup).

SUMMARY OF THE INVENTION

Based on the foregoing, a need exists to provide a more robust and secure workgroup security scheme for use with data in motion solutions.

In some embodiments, a workgroup management module is provided to manage workgroup encryption keys. The module may be integrated with third-party user authentication, user logon, or directory access services, such as Microsoft's® Active Directory (AD) directory service. The directory service may enforce security policies for users (and groups of users), as well as manage and verify workgroup membership and track workgroup and user activities.

The workgroup management module may be integrated with any of the secure data parsers described in the above-referenced U.S. patent and patent applications in order to secure data in motion between any two or more end points (e.g., clients or services) belonging to the same workgroup. In some embodiments, users are authenticated through the verification of a shared secret. For example, Digest Authentication may be used to transform a user's ASCII password into a cryptographic key. The client device may then request a challenge value, which is encrypted using the password-based key. The resulting ciphertext may then be transmitted to the authentication server. In response to receiving the ciphertext, the authentication server may perform the same encryption on the challenge value (using a stored copy of the user's password-based key) and verify that the received ciphertext and the result of the server's encryption are a match. If there is a match, the client may be authenticated. Otherwise, the authentication request may be denied.

After a user is authenticated, further requests for services and communications on the network may be handled by a Kerberos-based subsystem of the authentication server. Users or client devices may be supplied a Ticket Granting Ticket (TGT) that serves as a token to be given to a Key Distribution Center (KDC) whenever a secure service or secure communication with another workgroup member is desired. In some embodiments, the TGT may include a block or string of data indicative of one or more of the identity of the recipient, a timestamp, and any other credentials. The TGT may be encrypted under the KDC's Master Key so that only the KDC may read its contents.

To communication securely with a service (e.g., email or web server), a client may pass the TGT to the KDC and request a Service Ticket (ST). If the TGT is valid, the KDC may return two STs to the client, each containing the credentials of the parties involved in the communication, a timestamp, and a unique and fresh Session Key (SK) to be used as a temporary shared key between both parties for encryption. One of the STs may be encrypted using the shared password-based key between the user and the KDC, and the other ST may be encrypted using the shared password-based key between the service being accessed and the KDC. The ST encrypted for the client making the request may immediately be decrypted and the session key uncovered. The user may then send the second ST and a message encrypted using the SK to the targeted service. The service may then decrypt the ST with its password-based key to obtain the SK, and subsequently decrypt the message sent by the user. Through this process, the client and the service may now share the SK.

The SK may then be used as a Workgroup Key (WK) for use with the secure data parser. The WK may be stored locally to a client's KeyStore. The WK may also be used to wrap internally created session keys, including the Encryption Session Key (ESK) and the MAC Session Key (MK). After being wrapped with the WK, the ciphertexts may be securely shared among each header generated by the secure data parser, where a single share of each wrapped key is stored with each header. Accessing the ESK or MK now may require obtaining the WK and some minimum quorum of shares sufficient to restore the wrapped ESK and MK ciphertexts.

In some embodiments, the WK may be used to wrap an internally generated ESK. Once wrapped with the WK, the ciphertext may be again wrapped with a freshly generated Key Encrypting Key (KEK), resulting in an ESK that has been doubly wrapped and that can only be recovered with knowledge of both the WK and the KEK. The KEK may be securely shared among each header generated by the secure data parser, and the doubly wrapped ESK may be stored within each header. Recovering the ESK may now require obtaining WK and some minimum quorum of shares sufficient to rebuild the KEK.

In some embodiments, online key updates are supported. Each time a client wishes to update its key (or check the availability of an update), the client may interact with an online key server. This online key server may then distribute and share key material according to a workgroup security policy.

In some embodiments, online key updates may be made available on-demand, periodically on some schedule defined by the workgroup security policy, or automatically after some event (e.g., after a client's communication privileges are revoked or a client leaves a workgroup). The key update system may be managed by a Workgroup Authority (WA), which may control workgroup membership for multiple client devices and users. Each client or user in the system may be initially provisioned with a public/private keypair. Public keys may be registered with the WA, which may also record or store the public keys. Alternatively, in some embodiments, a symmetric encryption scheme may be used where each client or user in the system is initially provisioned with a secret key instead of a public/private keypair. Secret keys may be registered with the WA, which may also record or store the secret keys. The WA (or some other workgroup key server) may provide each device with the key server's public key certificate, which has been signed by a trusted Certificate Authority (CA).

To initiate an outgoing connection or receive an incoming connection, each client may contact its WA, which may, in some embodiments, interface with a third-party authentication or user logon service (e.g., an Active Directory server) to determine the client's workgroup membership. The client may then proves its identity to the WA using public-key or secret key techniques. The current WK may then be encrypted using a public-key or secret key encryption scheme such that a receiving client can decrypt the resulting ciphertext to obtain the current WK. The resulting ciphertext may also be signed by the key server (using the signing key corresponding to its certified public key) and transmitted to the requesting client.

In some embodiments, key updates may be supported even when the key server cannot be reached by a client (i.e., the client is untethered or partially untethered). Renewability may still be achieved by incorporating a mechanism to periodically update the shared workgroup key. On a periodic schedule, key updates may be initiated by the key server, which may interface with a third-party authentication or user logon service to determine group membership. Each key update may contain a fresh WK and its identifier. The WK may be encrypted using a public-key broadcast encryption scheme such that only the current workgroup members can decrypt the resulting ciphertext. The resulting ciphertext may then be signed by the key server (using the signing key corresponding to its certified public key) and transmitted to the non-revoked devices via a semi-trusted channel (e.g., a website). For example, when a client is prepared to go offline, the key server can pre-provision the client with key updates for a limited number of future time periods. Additionally or alternatively, for clients with limited network access, key revocation and update messages can be posted to a highly-available location, e.g., a TLS-secured public website.

To join a workgroup, in some embodiments, a client is first registered with the WA, and the client is then provisioned with a secret key. The WA may store the client's identity and secret key in a secure location (e.g., in an encrypted lookup table or keystore).

To initiate connections, in some embodiments, a client may connect to the WA using its secret key and request the WK. The WA may look up the client and use the stored key to decrypt the message. It may then responds with the WK encrypted with the client's secret key. The client may now use the WK to initiate a connection to another client in the workgroup. In some embodiments, the WA also indicates to the client an approximate duration of validity for the WK. Security policies in force on the client may require the client to contact the WA after key expiration for a key update (but the client may also check for key updates before key expiration if desired). When receiving a connection, security policies in force on the client may require a fresh and unexpired WK, verifying the status of the WK by the WA if necessary.

To revoke the communication privileges of a single client within a workgroup, the WA may refuse further key updates to the revoked client. A compromised client, therefore, may only have communication access to the workgroup during the period of time that the current WK is valid. Revocation may only affect new connections, or both new connections and existing connections (by terminating stale connections or forcing reconnection when a connection exceeds some system-defined length of time or number of connections).

To initiate a connection with another workgroup member, in some embodiments, the initiator may send the headers generated by the secure data parser to a recipient workgroup member. The headers may include one or more of the workgroup key, a workgroup key identifier, and a workgroup key version number. The recipient workgroup member may then check the workgroup key identifier to verify that the identifier is the correct identifier used for the current workgroup. The recipient workgroup member may also check the workgroup key version number to verify that the version number is the same as the recipient workgroup member's current workgroup key version number (and optionally if the current time is greater than the workgroup key refresh alarm time). If the workgroup key identifier is valid and the workgroup key version numbers are identical (and optionally if the current time is not greater than the workgroup key refresh alarm time), then the recipient workgroup member may report a successful connection attempt.

BRIEF DESCRIPTION OF THE DRAWINGS

The present invention is described in more detail below in connection with the attached drawings, which are meant to illustrate and not to limit the invention, and in which.

DETAILED DESCRIPTION

The present invention provides a cryptographic system where one or more secure servers, or a trust engine, stores cryptographic keys and user authentication data. Users may access the functionality of conventional cryptographic systems through network access to the trust engine, however, the trust engine does not release actual keys and other authentication data and therefore, the keys and data remain secure. This server-centric storage of keys and authentication data provides for user-independent security, portability, availability, and straightforwardness.

Because users can be confident in, or trust, the cryptographic system to perform user and document authentication and other cryptographic functions, a wide variety of functionality may be incorporated into the system. For example, the trust engine provider can ensure against agreement repudiation by, for example, authenticating the agreement participants, digitally signing the agreement on behalf of or for the participants, and storing a record of the agreement digitally signed by each participant. In addition, the cryptographic system may monitor agreements and determine to apply varying degrees of authentication, based on, for example, price, user, vendor, geographic location, place of use, or the like.

To facilitate a complete understanding of the invention, the remainder of the detailed description describes the invention with reference to the figures, wherein like elements are referenced with like numerals throughout.

Figure 1:
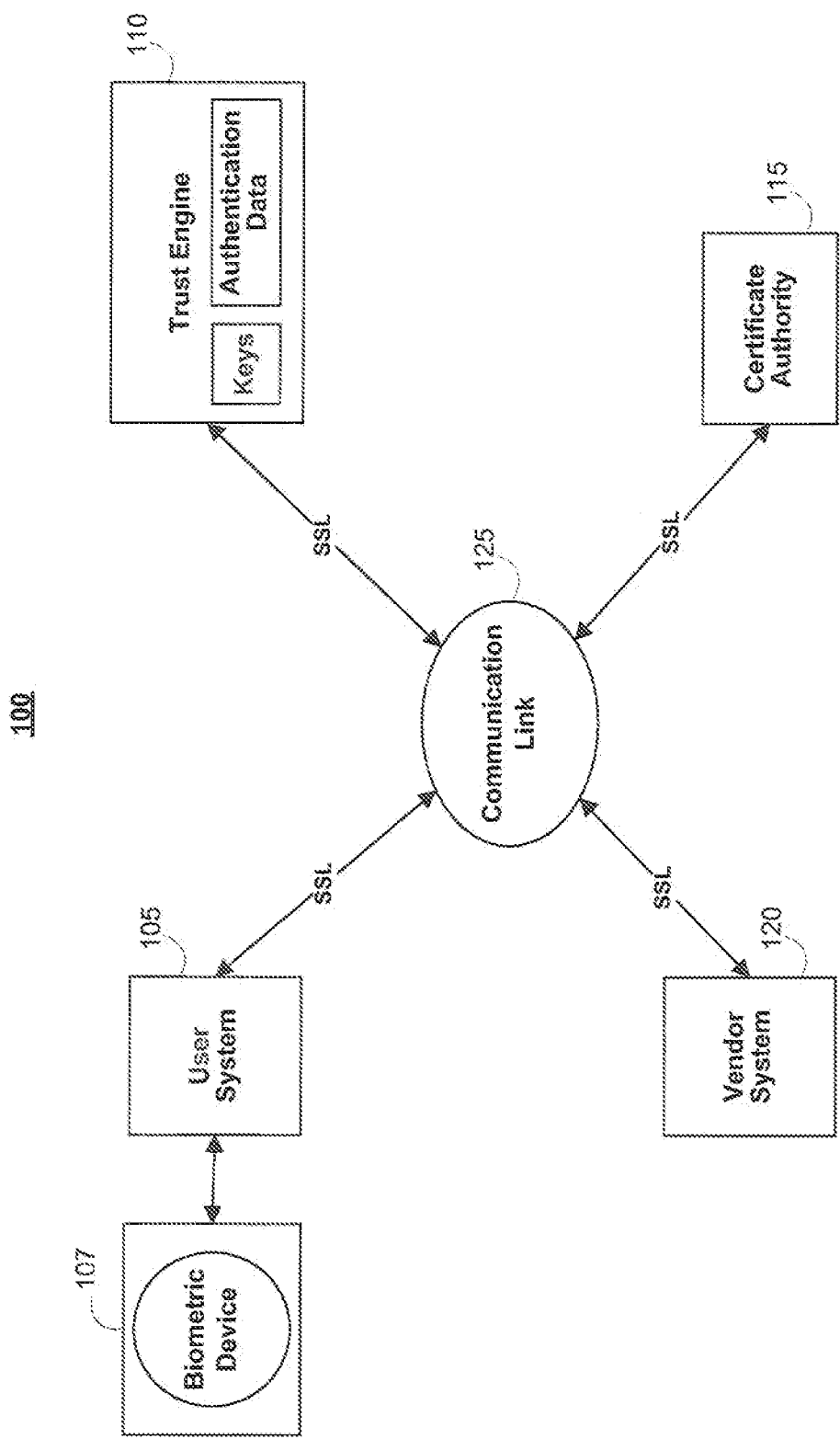
FIG. 1 illustrates a block diagram of a cryptographic system, according to aspects of an embodiment of the invention.

FIG. 1 illustrates a block diagram of a cryptographic system 100, according to aspects of an embodiment of the invention. As shown in FIG. 1, the cryptographic system 100 includes a user system 105, a trust engine 110, a certificate authority 115, and a vendor system 120, communicating through a communication link 125.

According to one embodiment of the invention, the user system 105 comprises a conventional general-purpose computer having one or more microprocessors, such as, for example, an Intel-based processor. Moreover, the user system 105 includes an appropriate operating system, such as, for example, an operating system capable of including graphics or windows, such as Windows, Unix, Linux, or the like. As shown in FIG. 1, the user system 105 may include a biometric device 107. The biometric device 107 may advantageously capture a user's biometric and transfer the captured biometric to the trust engine 110. According to one embodiment of the invention, the biometric device may advantageously comprise a device having attributes and features similar to those disclosed in U.S. Pat. No. 6,856,383, entitled "RELIEF OBJECT IMAGE GENERATOR," U.S. patent application Ser. No. 09/558,634, filed on Apr. 26, 2000, entitled "IMAGING DEVICE FOR A RELIEF OBJECT AND SYSTEM AND METHOD OF USING THE IMAGE DEVICE," U.S. Pat. No. 6,631,201, entitled "RELIEF OBJECT SENSOR ADAPTOR," and U.S. patent application Ser. No. 09/477,943, filed on Jan. 5, 2000, entitled "PLANAR OPTICAL IMAGE SENSOR AND SYSTEM FOR GENERATING AN ELECTRONIC IMAGE OF A RELIEF OBJECT FOR FINGERPRINT READING," all of which are owned by the instant assignee, and all of which are hereby incorporated by reference herein.

In addition, the user system 105 may connect to the communication link 125 through a conventional service provider, such as, for example, a dial up, digital subscriber line (DSL), cable modem, fiber connection, or the like. According to another embodiment, the user system 105 connects the communication link 125 through network connectivity such as, for example, a local or wide area network. According to one embodiment, the operating system includes a TCP/IP stack that handles all incoming and outgoing message traffic passed over the communication link 125.

Although the user system 105 is disclosed with reference to the foregoing embodiments, the invention is not intended to be limited thereby. Rather, a skilled artisan will recognize from the disclosure herein, a wide number of alternatives embodiments of the user system 105, including almost any computing device capable of sending or receiving information from another computer system. For example, the user system 105 may include, but is not limited to, a computer workstation, an interactive television, an interactive kiosk, a personal mobile computing device, such as a digital assistant, mobile or cellular telephone, laptop, or the like, a wireless communications device, a smartcard, an embedded computing device, or the like, which can interact with the communication link 125. In such alternative systems, the operating systems will likely differ and be adapted for the particular device. However, according to one embodiment, the operating systems advantageously continue to provide the appropriate communications protocols needed to establish communication with the communication link 125.

FIG. 1 illustrates the trust engine 110. According to one embodiment, the trust engine 110 comprises one or more secure servers for accessing and storing sensitive information, which may be any type or form of data, such as, but not limited to text, audio, video, user authentication data and public and private cryptographic keys. According to one embodiment, the authentication data includes data designed to uniquely identify a user of the cryptographic system 100. For example, the authentication data may include a user identification number, one or more biometrics, and a series of questions and answers generated by the trust engine 110 or the user, but answered initially by the user at enrollment. The foregoing questions may include demographic data, such as place of birth, address, anniversary, or the like, personal data, such as mother's maiden name, favorite ice cream, or the like, or other data designed to uniquely identify the user. The trust engine 110 compares a user's authentication data associated with a current transaction, to the authentication data provided at an earlier time, such as, for example, during enrollment. The trust engine 110 may advantageously require the user to produce the authentication data at the time of each transaction, or, the trust engine 110 may advantageously allow the user to periodically produce authentication data, such as at the beginning of a string of transactions or the logging onto a particular vendor website.

According to the embodiment where the user produces biometric data, the user provides a physical characteristic, such as, but not limited to, facial scan, hand scan, ear scan, iris scan, retinal scan, vascular pattern, DNA, a fingerprint, writing or speech, to the biometric device 107. The biometric device advantageously produces an electronic pattern, or biometric, of the physical characteristic. The electronic pattern is transferred through the user system 105 to the trust engine 110 for either enrollment or authentication purposes.

Once the user produces the appropriate authentication data and the trust engine 110 determines a positive match between that authentication data (current authentication data) and the authentication data provided at the time of enrollment (enrollment authentication data), the trust engine 110 provides the user with complete cryptographic functionality. For example, the properly authenticated user may advantageously employ the trust engine 110 to perform hashing, digitally signing, encrypting and decrypting (often together referred to only as encrypting), creating or distributing digital certificates, and the like. However, the private cryptographic keys used in the cryptographic functions will not be available outside the trust engine 110, thereby ensuring the integrity of the cryptographic keys.

According to one embodiment, the trust engine 110 generates and stores cryptographic keys. According to another embodiment, at least one cryptographic key is associated with each user. Moreover, when the cryptographic keys include public-key technology, each private key associated with a user is generated within, and not released from, the trust engine 110. Thus, so long as the user has access to the trust engine 110, the user may perform cryptographic functions using his or her private or public key. Such remote access advantageously allows users to remain completely mobile and access cryptographic functionality through practically any Internet connection, such as cellular and satellite phones, kiosks, laptops, hotel rooms and the like.

According to another embodiment, the trust engine 110 performs the cryptographic functionality using a key pair generated for the trust engine 110. According to this embodiment, the trust engine 110 first authenticates the user, and after the user has properly produced authentication data matching the enrollment authentication data, the trust engine 110 uses its own cryptographic key pair to perform cryptographic functions on behalf of the authenticated user.

A skilled artisan will recognize from the disclosure herein that all the cryptographic keys may advantageously include one or more of symmetric encryption keys (e.g., private keys) and asymmetric encryption keys (e.g., public/private key-pairs). In addition, a skilled artisan will recognize from the disclosure herein that the foregoing keys may be implemented with a wide number of algorithms available from commercial technologies, such as, for example, RSA, ELGAMAL, or the like. When an asymmetric cryptographic scheme is described herein, this scheme may be substituted with a symmetric scheme, and vice versa.

FIG. 1 also illustrates the certificate authority 115. According to one embodiment, the certificate authority 115 may advantageously comprise a trusted third-party organization or company that issues digital certificates, such as, for example, VeriSign, Baltimore, Entrust, or the like. The trust engine 110 may advantageously transmit requests for digital certificates, through one or more conventional digital certificate protocols, such as, for example, PKCS 10, to the certificate authority 115. In response, the certificate authority 115 will issue a digital certificate in one or more of a number of differing protocols, such as, for example, PKCS7. According to one embodiment of the invention, the trust engine 110 requests digital certificates from several or all of the prominent certificate authorities 115 such that the trust engine 110 has access to a digital certificate corresponding to the certificate standard of any requesting party.

According to another embodiment, the trust engine 110 internally performs certificate issuances. In this embodiment, the trust engine 110 may access a certificate system for generating certificates and/or may internally generate certificates when they are requested, such as, for example, at the time of key generation or in the certificate standard requested at the time of the request. The trust engine 110 will be disclosed in greater detail below.

FIG. 1 also illustrates the vendor system 120. According to one embodiment, the vendor system 120 advantageously comprises a Web server. Typical Web servers generally serve content over the Internet using one of several internet markup languages or document format standards, such as the Hyper-Text Markup Language (HTML) or the Extensible Markup Language (XML). The Web server accepts requests from browsers like Netscape and Internet Explorer and then returns the appropriate electronic documents. A number of server or client-side technologies can be used to increase the power of the Web server beyond its ability to deliver standard electronic documents. For example, these technologies include Common Gateway Interface (CGI) scripts, Secure Sockets Layer (SSL) security, and Active Server Pages (ASPs). The vendor system 120 may advantageously provide electronic content relating to commercial, personal, educational, or other transactions.

Although the vendor system 120 is disclosed with reference to the foregoing embodiments, the invention is not intended to be limited thereby. Rather, a skilled artisan will recognize from the disclosure herein that the vendor system 120 may advantageously comprise any of the devices described with reference to the user system 105 or combination thereof.

FIG. 1 also illustrates the communication link 125 connecting the user system 105, the trust engine 110, the certificate authority 115, and the vendor system 120. According to one embodiment, the communication link 125 preferably comprises the Internet. The Internet, as used throughout this disclosure is a global network of computers. The structure of the Internet, which is well known to those of ordinary skill in the art, includes a network backbone with networks branching from the backbone. These branches, in turn, have networks branching from them, and so on. Routers move information packets between network levels, and then from network to network, until the packet reaches the neighborhood of its destination. From the destination, the destination network's host directs the information packet to the appropriate terminal, or node. In one advantageous embodiment, the Internet routing hubs comprise domain name system (DNS) servers using Transmission Control Protocol/Internet Protocol (TCP/IP) as is well known in the art. The routing hubs connect to one or more other routing hubs via high-speed communication links.

One popular part of the Internet is the World Wide Web. The World Wide Web contains different computers, which store documents capable of displaying graphical and textual information. The computers that provide information on the World Wide Web are typically called "websites." A website is defined by an Internet address that has an associated electronic page. The electronic page can be identified by a Uniform Resource Locator (URL). Generally, an electronic page is a document that organizes the presentation of text, graphical images, audio, video, and so forth.

Although the communication link 125 is disclosed in terms of its preferred embodiment, one of ordinary skill in the art will recognize from the disclosure herein that the communication link 125 may include a wide range of interactive communications links. For example, the communication link 125 may include interactive television networks, telephone networks, wireless data transmission systems, two-way cable systems, customized private or public computer networks, interactive kiosk networks, automatic teller machine networks, direct links, satellite or cellular networks, and the like.

Figure 2:
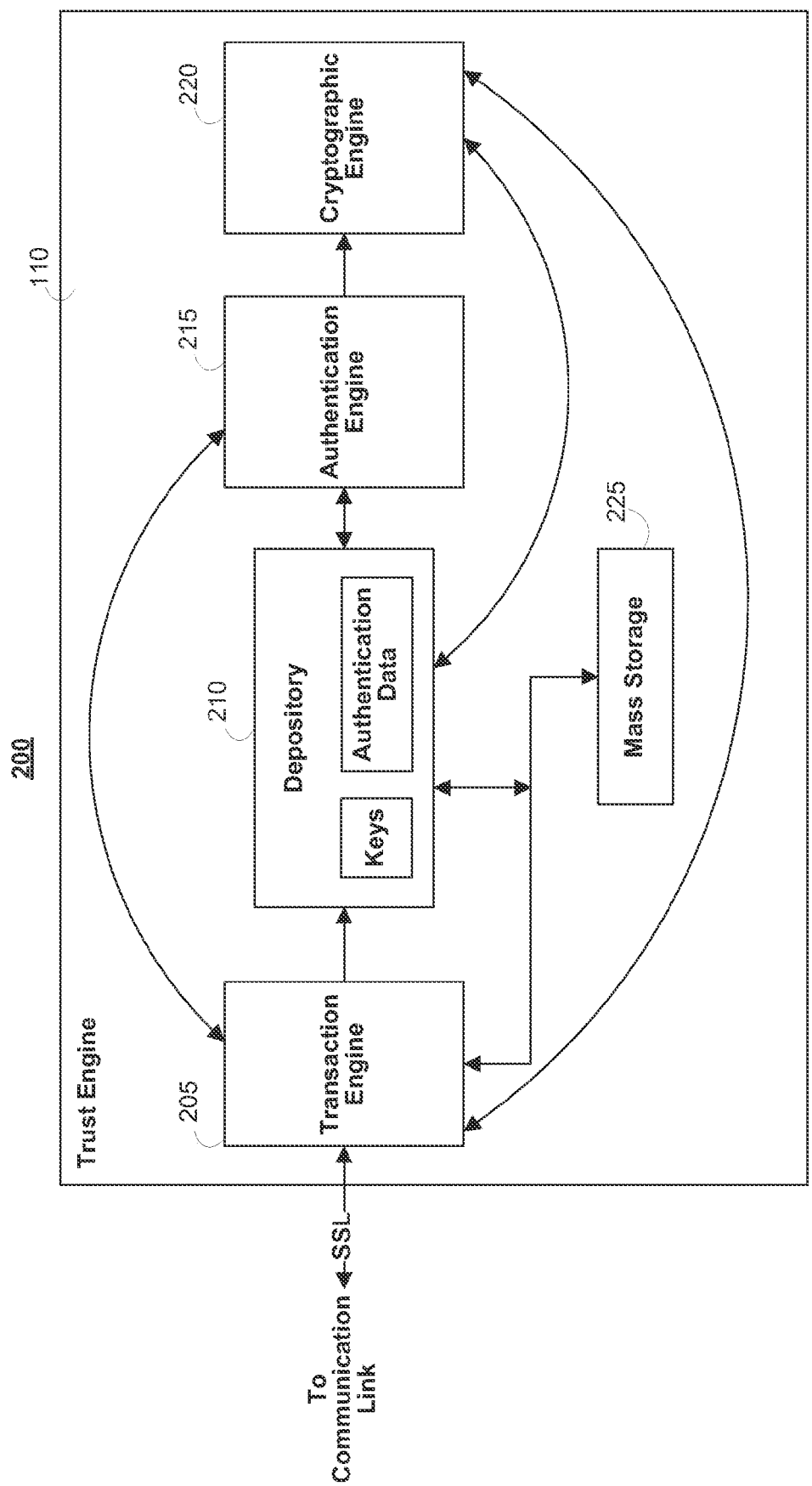
FIG. 2 illustrates a block diagram of the trust engine of FIG. 1, according to aspects of an embodiment of the invention.

FIG. 2 illustrates a block diagram of the trust engine 110 of FIG. 1 according to aspects of an embodiment of the invention. As shown in FIG. 2, the trust engine 110 includes a transaction engine 205, a depository 210, an authentication engine 215, and a cryptographic engine 220. According to one embodiment of the invention, the trust engine 110 also includes mass storage 225. As further shown in FIG. 2, the transaction engine 205 communicates with the depository 210, the authentication engine 215, and the cryptographic engine 220, along with the mass storage 225. In addition, the depository 210 communicates with the authentication engine 215, the cryptographic engine 220, and the mass storage 225. Moreover, the authentication engine 215 communicates with the cryptographic engine 220. According to one embodiment of the invention, some or all of the foregoing communications may advantageously comprise the transmission of XML documents to IP addresses that correspond to the receiving device. As mentioned in the foregoing, XML documents advantageously allow designers to create their own customized document tags, enabling the definition, transmission, validation, and interpretation of data between applications and between organizations. Moreover, some or all of the foregoing communications may include conventional SSL technologies.

According to one embodiment, the transaction engine 205 comprises a data routing device, such as a conventional Web server available from Netscape, Microsoft, Apache, or the like. For example, the Web server may advantageously receive incoming data from the communication link 125. According to one embodiment of the invention, the incoming data is addressed to a front-end security system for the trust engine 110. For example, the front-end security system may advantageously include a firewall, an intrusion detection system searching for known attack profiles, and/or a virus scanner. After clearing the front-end security system, the data is received by the transaction engine 205 and routed to one of the depository 210, the authentication engine 215, the cryptographic engine 220, and the mass storage 225. In addition, the transaction engine 205 monitors incoming data from the authentication engine 215 and cryptographic engine 220, and routes the data to particular systems through the communication link 125. For example, the transaction engine 205 may advantageously route data to the user system 105, the certificate authority 115, or the vendor system 120.

According to one embodiment, the data is routed using conventional HTTP routing techniques, such as, for example, employing URLs or Uniform Resource Indicators (URIs). URIs are similar to URLs, however, URIs typically indicate the source of files or actions, such as, for example, executables, scripts, and the like. Therefore, according to the one embodiment, the user system 105, the certificate authority 115, the vendor system 120, and the components of the trust engine 210, advantageously include sufficient data within communication URLs or URIs for the transaction engine 205 to properly route data throughout the cryptographic system.

Although the data routing is disclosed with reference to its preferred embodiment, a skilled artisan will recognize a wide number of possible data routing solutions or strategies. For example, XML or other data packets may advantageously be unpacked and recognized by their format, content, or the like, such that the transaction engine 205 may properly route data throughout the trust engine 110. Moreover, a skilled artisan will recognize that the data routing may advantageously be adapted to the data transfer protocols conforming to particular network systems, such as, for example, when the communication link 125 comprises a local network.

According to yet another embodiment of the invention, the transaction engine 205 includes conventional SSL encryption technologies, such that the foregoing systems may authenticate themselves, and vise-versa, with transaction engine 205, during particular communications. As will be used throughout this disclosure, the term "½ SSL" refers to communications where a server but not necessarily the client, is SSL authenticated, and the term "FULL SSL" refers to communications where the client and the server are SSL authenticated. When the instant disclosure uses the term "SSL", the communication may comprise ½ or FULL SSL.

As the transaction engine 205 routes data to the various components of the cryptographic system 100, the transaction engine 205 may advantageously create an audit trail. According to one embodiment, the audit trail includes a record of at least the type and format of data routed by the transaction engine 205 throughout the cryptographic system 100. Such audit data may advantageously be stored in the mass storage 225.

FIG. 2 also illustrates the depository 210. According to one embodiment, the depository 210 comprises one or more data storage facilities, such as, for example, a directory server, a database server, or the like. As shown in FIG. 2, the depository 210 stores cryptographic keys and enrollment authentication data. The cryptographic keys may advantageously correspond to the trust engine 110 or to users of the cryptographic system 100, such as the user or vendor. The enrollment authentication data may advantageously include data designed to uniquely identify a user, such as, user ID, passwords, answers to questions, biometric data, or the like. This enrollment authentication data may advantageously be acquired at enrollment of a user or another alternative later time. For example, the trust engine 110 may include periodic or other renewal or reissue of enrollment authentication data.

According to one embodiment, the communication from the transaction engine 205 to and from the authentication engine 215 and the cryptographic engine 220 comprises secure communication, such as, for example conventional SSL technology. In addition, as mentioned in the foregoing, the data of the communications to and from the depository 210 may be transferred using URLs, URIs, HTTP or XML documents, with any of the foregoing advantageously having data requests and formats embedded therein.

As mentioned above, the depository 210 may advantageously comprises a plurality of secure data storage facilities. In such an embodiment, the secure data storage facilities may be configured such that a compromise of the security in one individual data storage facility will not compromise the cryptographic keys or the authentication data stored therein. For example, according to this embodiment, the cryptographic keys and the authentication data are mathematically operated on so as to statistically and substantially randomize the data stored in each data storage facility. According to one embodiment, the randomization of the data of an individual data storage facility renders that data undecipherable. Thus, compromise of an individual data storage facility produces only a randomized undecipherable number and does not compromise the security of any cryptographic keys or the authentication data as a whole.

FIG. 2 also illustrates the trust engine 110 including the authentication engine 215. According to one embodiment, the authentication engine 215 comprises a data comparator configured to compare data from the transaction engine 205 with data from the depository 210. For example, during authentication, a user supplies current authentication data to the trust engine 110 such that the transaction engine 205 receives the current authentication data. As mentioned in the foregoing, the transaction engine 205 recognizes the data requests, preferably in the URL or URI, and routes the authentication data to the authentication engine 215. Moreover, upon request, the depository 210 forwards enrollment authentication data corresponding to the user to the authentication engine 215. Thus, the authentication engine 215 has both the current authentication data and the enrollment authentication data for comparison.

According to one embodiment, the communications to the authentication engine comprise secure communications, such as, for example, SSL technology. Additionally, security can be provided within the trust engine 110 components, such as, for example, super-encryption using public key technologies. For example, according to one embodiment, the user encrypts the current authentication data with the public key of the authentication engine 215. In addition, the depository 210 also encrypts the enrollment authentication data with the public key of the authentication engine 215. In this way, only the authentication engine's private key can be used to decrypt the transmissions.

As shown in FIG. 2, the trust engine 110 also includes the cryptographic engine 220. According to one embodiment, the cryptographic engine comprises a cryptographic handling module, configured to advantageously provide conventional cryptographic functions, such as, for example, public-key infrastructure (PKI) functionality. For example, the cryptographic engine 220 may advantageously issue public and private keys for users of the cryptographic system 100. In this manner, the cryptographic keys are generated at the cryptographic engine 220 and forwarded to the depository 210 such that at least the private cryptographic keys are not available outside of the trust engine 110. According to another embodiment, the cryptographic engine 220 randomizes and splits at least the private cryptographic key data, thereby storing only the randomized split data. Similar to the splitting of the enrollment authentication data, the splitting process ensures the stored keys are not available outside the cryptographic engine 220. According to another embodiment, the functions of the cryptographic engine can be combined with and performed by the authentication engine 215.

According to one embodiment, communications to and from the cryptographic engine include secure communications, such as SSL technology. In addition, XML documents may advantageously be employed to transfer data and/or make cryptographic function requests.

FIG. 2 also illustrates the trust engine 110 having the mass storage 225. As mentioned in the foregoing, the transaction engine 205 keeps data corresponding to an audit trail and stores such data in the mass storage 225. Similarly, according to one embodiment of the invention, the depository 210 keeps data corresponding to an audit trail and stores such data in the mass storage device 225. The depository audit trail data is similar to that of the transaction engine 205 in that the audit trail data comprises a record of the requests received by the depository 210 and the response thereof. In addition, the mass storage 225 may be used to store digital certificates having the public key of a user contained therein.

Although the trust engine 110 is disclosed with reference to its preferred and alternative embodiments, the invention is not intended to be limited thereby. Rather, a skilled artisan will recognize in the disclosure herein, a wide number of alternatives for the trust engine 110. For example, the trust engine 110, may advantageously perform only authentication, or alternatively, only some or all of the cryptographic functions, such as data encryption and decryption. According to such embodiments, one of the authentication engine 215 and the cryptographic engine 220 may advantageously be removed, thereby creating a more straightforward design for the trust engine 110. In addition, the cryptographic engine 220 may also communicate with a certificate authority such that the certificate authority is embodied within the trust engine 110. According to yet another embodiment, the trust engine 110 may advantageously perform authentication and one or more cryptographic functions, such as, for example, digital signing.

Figure 3:
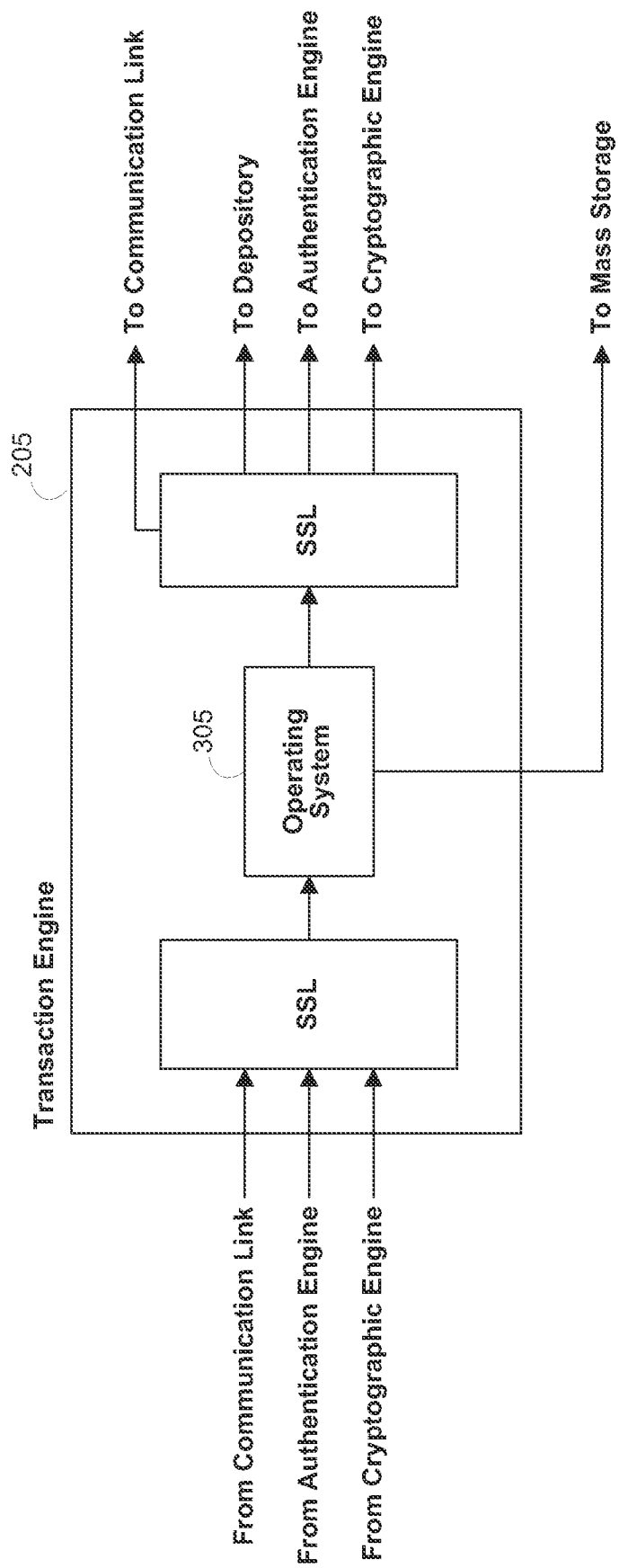
FIG. 3 illustrates a block diagram of the transaction engine of FIG. 2, according to aspects of an embodiment of the invention.

FIG. 3 illustrates a block diagram of the transaction engine 205 of FIG. 2, according to aspects of an embodiment of the invention. According to this embodiment, the transaction engine 205 comprises an operating system 305 having a handling thread and a listening thread. The operating system 305 may advantageously be similar to those found in conventional high volume servers, such as, for example, Web servers available from Apache. The listening thread monitors the incoming communication from one of the communication link 125, the authentication engine 215, and the cryptographic engine 220 for incoming data flow. The handling thread recognizes particular data structures of the incoming data flow, such as, for example, the foregoing data structures, thereby routing the incoming data to one of the communication link 125, the depository 210, the authentication engine 215, the cryptographic engine 220, or the mass storage 225. As shown in FIG. 3, the incoming and outgoing data may advantageously be secured through, for example, SSL technology.

Figure 4:
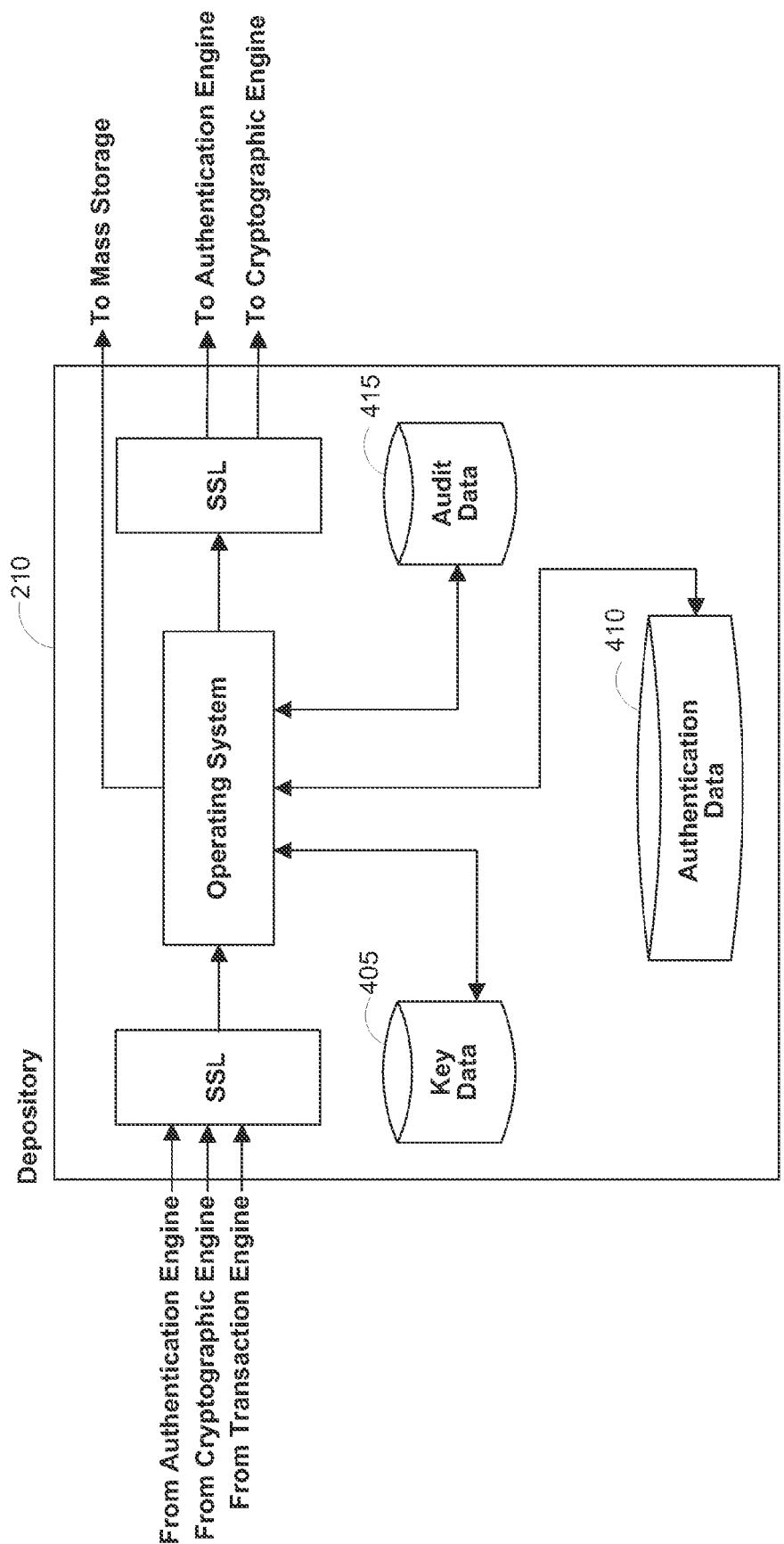
FIG. 4 illustrates a block diagram of the depository of FIG. 2, according to aspects of an embodiment of the invention.

FIG. 4 illustrates a block diagram of the depository 210 of FIG. 2 according to aspects of an embodiment of the invention. According to this embodiment, the depository 210 comprises one or more lightweight directory access protocol (LDAP) servers. LDAP directory servers are available from a wide variety of manufacturers such as Netscape, ISO, Microsoft, and others. FIG. 4 also shows that the directory server preferably stores data 405 corresponding to the cryptographic keys and data 410 corresponding to the enrollment authentication data. According to one embodiment, the depository 210 comprises a single logical memory structure indexing authentication data and cryptographic key data to a unique user ID. The single logical memory structure preferably includes mechanisms to ensure a high degree of trust, or security, in the data stored therein. For example, the physical location of the depository 210 may advantageously include a wide number of conventional security measures, such as limited employee access, modern surveillance systems, and the like. In addition to, or in lieu of, the physical securities, the computer system or server may advantageously include software solutions to protect the stored data. For example, the depository 210 may advantageously create and store data 415 corresponding to an audit trail of actions taken. In addition, the incoming and outgoing communications may advantageously be encrypted with public key encryption coupled with conventional SSL technologies.

According to another embodiment, the depository 210 may include distinct and physically separated data storage facilities. For example, depository 210 may include more than one physical storage device (e.g., tape drive, hard disk drive, optical drive, or any combination thereof) housed in geographically separated locations.

Figure 5:
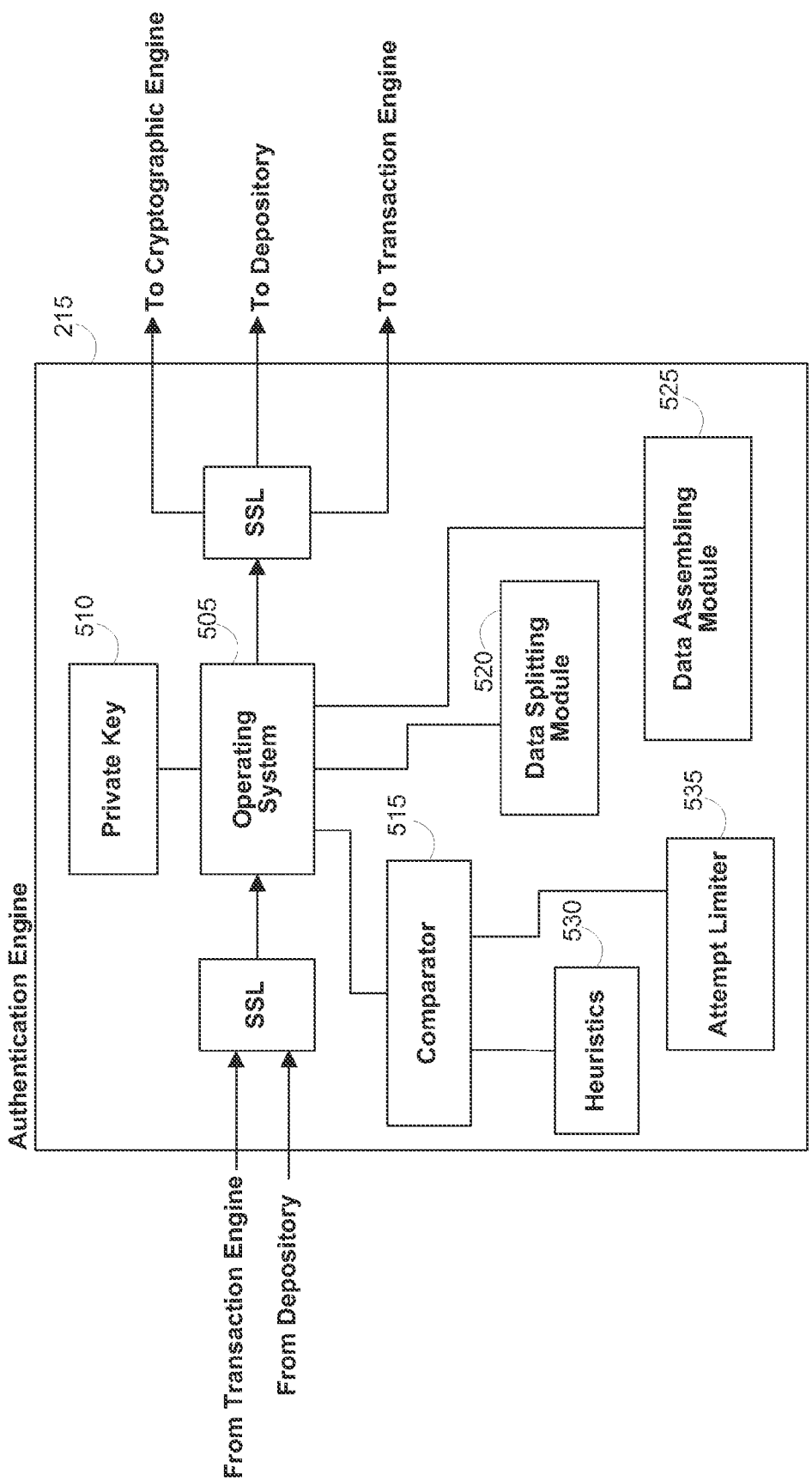
FIG. 5 illustrates a block diagram of the authentication engine of FIG. 2, according to aspects of an embodiment of the invention.

FIG. 5 illustrates a block diagram of the authentication engine 215 of FIG. 2 according to aspects of an embodiment of the invention. Similar to the transaction engine 205 of FIG. 3, the authentication engine 215 comprises an operating system 505 having at least a listening and a handling thread of a modified version of a conventional Web server, such as, for example, Web servers available from Apache. As shown in FIG. 5, the authentication engine 215 includes access to at least one private key 510. The private key 510 may advantageously be used for example, to decrypt data from the transaction engine 205 or the depository 210, which was encrypted with a corresponding public key of the authentication engine 215.

FIG. 5 also illustrates the authentication engine 215 comprising a comparator 515, a data splitting module 520, and a data assembling module 525. According to an embodiment of the invention, the comparator 515 includes technology capable of comparing potentially complex patterns related to the foregoing biometric authentication data. The technology may include hardware, software, or combined solutions for pattern comparisons, such as, for example, those representing finger print patterns or voice patterns. In addition, according to one embodiment, the comparator 515 of the authentication engine 215 may advantageously compare conventional hashes of documents in order to render a comparison result. According to one embodiment of the invention, the comparator 515 includes the application of heuristics 530 to the comparison. The heuristics 530 may advantageously address circumstances surrounding an authentication attempt, such as, for example, the time of day, IP address or subnet mask, purchasing profile, email address, processor serial number or ID, or the like.

Moreover, the nature of biometric data comparisons may result in varying degrees of confidence being produced from the matching of current biometric authentication data to enrollment data. For example, unlike a traditional password which may only return a positive or negative match, a fingerprint may be determined to be a partial match, e.g. a 90% match, a 75% match, or a 10% match, rather than simply being correct or incorrect. Other biometric identifiers such as voice print analysis or face recognition may share this property of probabilistic authentication, rather than absolute authentication.

When working with such probabilistic authentication or in other cases where an authentication is considered less than absolutely reliable, it is desirable to apply the heuristics 530 to determine whether the level of confidence in the authentication provided is sufficiently high to authenticate the transaction which is being made.

It will sometimes be the case that the transaction at issue is a relatively low value transaction where it is acceptable to be authenticated to a lower level of confidence. This could include a transaction which has a low dollar value associated with it (e.g., a $10 purchase) or a transaction with low risk (e.g., admission to a members-only web site).

Conversely, for authenticating other transactions, it may be desirable to require a high degree of confidence in the authentication before allowing the transaction to proceed. Such transactions may include transactions of large dollar value (e.g., signing a multi-million dollar supply contract) or transaction with a high risk if an improper authentication occurs (e.g., remotely logging onto a government computer).

The use of the heuristics 530 in combination with confidence levels and transactions values may be used as will be described below to allow the comparator to provide a dynamic context-sensitive authentication system.

According to another embodiment of the invention, the comparator 515 may advantageously track authentication attempts for a particular transaction. For example, when a transaction fails, the trust engine 110 may request the user to re-enter his or her current authentication data. The comparator 515 of the authentication engine 215 may advantageously employ an attempt limiter 535 to limit the number of authentication attempts, thereby prohibiting brute-force attempts to impersonate a user's authentication data. According to one embodiment, the attempt limiter 535 comprises a software module monitoring transactions for repeating authentication attempts and, for example, limiting the authentication attempts for a given transaction to three. Thus, the attempt limiter 535 will limit an automated attempt to impersonate an individual's authentication data to, for example, simply three "guesses." Upon three failures, the attempt limiter 535 may advantageously deny additional authentication attempts. Such denial may advantageously be implemented through, for example, the comparator 515 returning a negative result regardless of the current authentication data being transmitted. On the other hand, the transaction engine 205 may advantageously block any additional authentication attempts pertaining to a transaction in which three attempts have previously failed.

The authentication engine 215 also includes the data splitting module 520 and the data assembling module 525. The data splitting module 520 advantageously comprises a software, hardware, or combination module having the ability to mathematically operate on various data so as to substantially randomize (e.g., randomize or pseudo-randomize) and split the data into individual portions (also called shares). In some embodiments, to substantially randomize data, data splitting module 520 may generate random or pseudo-random numbers. The random or pseudo-random numbers may then be associated with units (e.g., any number of bits, bytes, or blocks) of data from a data set. The random or pseudo-random numbers may also be associated with the shares. Data splitting module 520 may determine into which share to store each unit of data from the data set based on, at least in part, the association of the random or pseudo-random numbers with the units of data and the shares.

According to one embodiment, original data is not recreatable from an individual portion or user share. The data assembling module 525 advantageously comprises a software, hardware, or combination module configured to mathematically operate on the foregoing substantially randomized portions, such that the combination thereof provides the original deciphered data. According to one embodiment, the authentication engine 215 employs the data splitting module 520 to randomize and split enrollment authentication data into portions, and employs the data assembling module 525 to reassemble the portions into usable enrollment authentication data.

Figure 6:
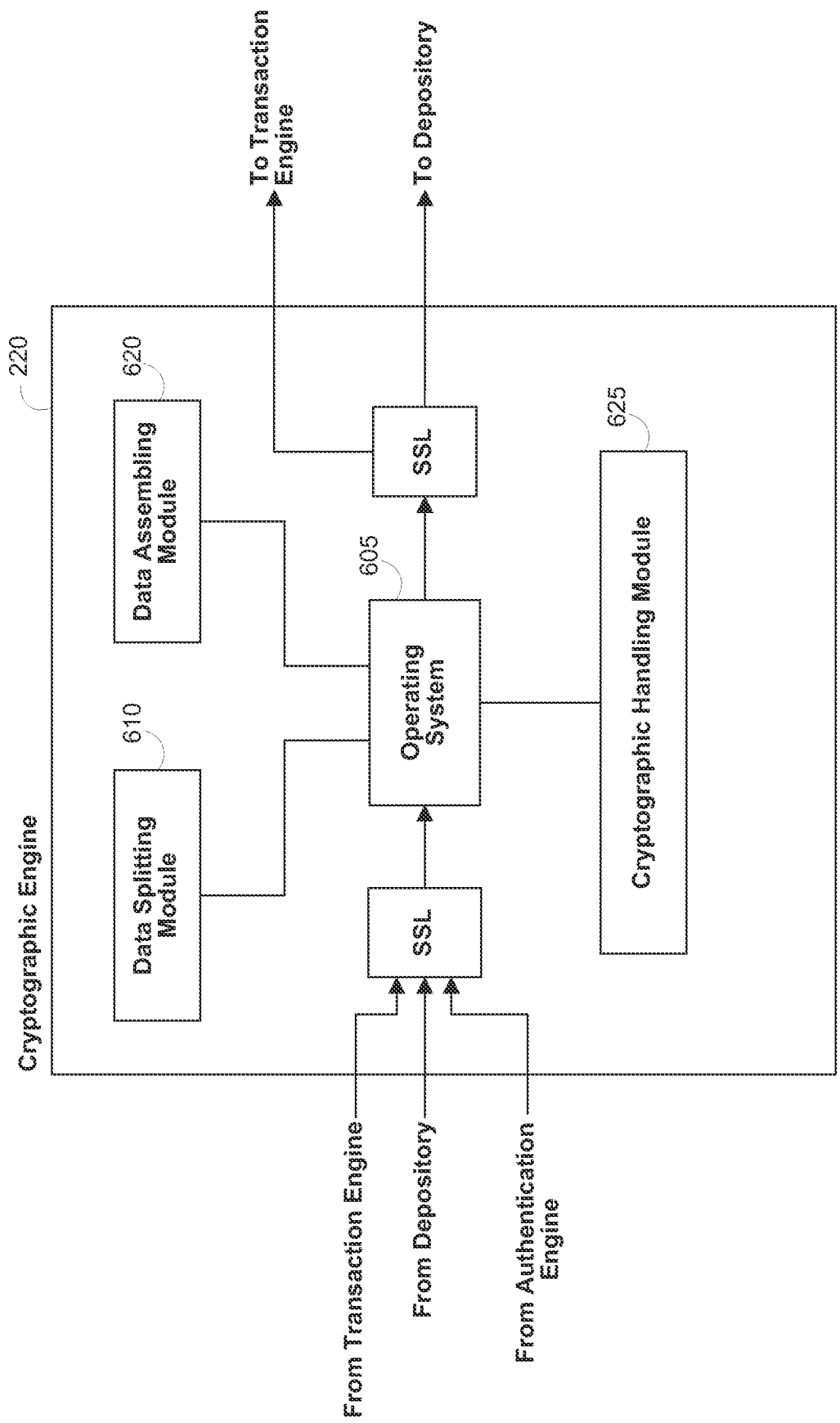
FIG. 6 illustrates a block diagram of the cryptographic engine of FIG. 2, according to aspects of an embodiment of the invention.

FIG. 6 illustrates a block diagram of the cryptographic engine 220 of the trust engine 200 of FIG. 2 according to aspects of one embodiment of the invention. Similar to the transaction engine 205 of FIG. 3, the cryptographic engine 220 comprises an operating system 605 having at least a listening and a handling thread of a modified version of a conventional Web server, such as, for example, Web servers available from Apache. As shown in FIG. 6, the cryptographic engine 220 comprises a data splitting module 610 and a data assembling module 620 that function similar to those of FIG. 5. However, according to one embodiment, the data splitting module 610 and the data assembling module 620 process cryptographic key data, as opposed to the foregoing enrollment authentication data. Although, a skilled artisan will recognize from the disclosure herein that the data splitting module 910 and the data splitting module 620 may be combined with those of the authentication engine 215.

The cryptographic engine 220 also comprises a cryptographic handling module 625 configured to perform one, some or all of a wide number of cryptographic functions. According to one embodiment, the cryptographic handling module 625 may comprise software modules or programs, hardware, or both. According to another embodiment, the cryptographic handling module 625 may perform data comparisons, data parsing, data splitting, data separating, data hashing, data encryption or decryption, digital signature verification or creation, digital certificate generation, storage, or requests, cryptographic key generation, or the like. Moreover, a skilled artisan will recognize from the disclosure herein that the cryptographic handling module 825 may advantageously comprises a public-key infrastructure, such as Pretty Good Privacy (PGP), an RSA-based public-key system, or a wide number of alternative key management systems. In addition, the cryptographic handling module 625 may perform public-key encryption, symmetric-key encryption, or both. In addition to the foregoing, the cryptographic handling module 625 may include one or more computer programs or modules, hardware, or both, for implementing seamless, transparent, interoperability functions.

A skilled artisan will also recognize from the disclosure herein that the cryptographic functionality may include a wide number or variety of functions generally relating to cryptographic key management systems.

The secure data parser of the present invention may be integrated into an operating system kernel (e.g., Linux, Unix, or any other suitable commercial or proprietary operating system). This integration may be used to protect data at the device level whereby, for example, data that would ordinarily be stored in one or more devices is separated into a certain number of portions by the secure data parser integrated into the operating system and stored among the one or more devices. When original data is attempted to be accessed, the appropriate software, also integrated into the operating system, may recombine the parsed data portions into the original data in a way that may be transparent to the end user.

The secure data parser of the present invention may be integrated into a volume manager or any other suitable component of a storage system to protect local and networked data storage across any or all supported platforms. For example, with the secure data parser integrated, a storage system may make use of the redundancy offered by the secure data parser (i.e., which is used to implement the feature of needing fewer than all separated portions of data in order to reconstruct the original data) to protect against data loss. The secure data parser also allows all data written to storage devices, whether using redundancy or not, to be in the form of multiple portions that are generated according to the parsing of the present invention. When original data is attempted to be accessed, the appropriate software, also integrated into the volume manager or other suitable component of the storage system, may recombine the parsed data portions into the original data in a way that may be transparent to the end user.

In one suitable approach, the secure data parser of the present invention may be integrated into a RAID controller (as either hardware or software). This allows for the secure storage of data to multiple drives while maintaining fault tolerance in case of drive failure.

The secure data parser of the present invention may be integrated into a database in order to, for example, protect sensitive table information. For example, in one suitable approach, data associated with particular cells of a database table (e.g., individual cells, one or more particular columns, one or more particular rows, any combination thereof, or an entire database table) may be parsed and separated according to the present invention (e.g., where the different portions are stored on one or more storage devices at one or more locations or on a single storage device). Access to recombine the portions in order to view the original data may be granted by traditional authentication methods (e.g., username and password query).

The secure parser of the present invention may be integrated in any suitable system that involves data in motion (i.e., transfer of data from one location to another). Such systems include, for example, network file servers and file systems, email servers, web servers, streaming data broadcasts, and wireless (e.g., WiFi) communications. With respect to email, in one suitable approach, the secure parser may be used to parse outgoing messages (i.e., containing text, binary data, or both (e.g., files attached to an email message)) and sending the different portions of the parsed data along different paths thus creating multiple streams of data. If any one of these streams of data is compromised, the original message remains secure because the system may require that more than one of the portions be combined, in accordance with the present invention, in order to generate the original data. In another suitable approach, the different portions of data may be communicated along one path sequentially so that if one portion is obtained, it may not be sufficient to generate the original data. The different portions arrive at the intended recipient's location and may be combined to generate the original data in accordance with the present invention.

Figure 7:
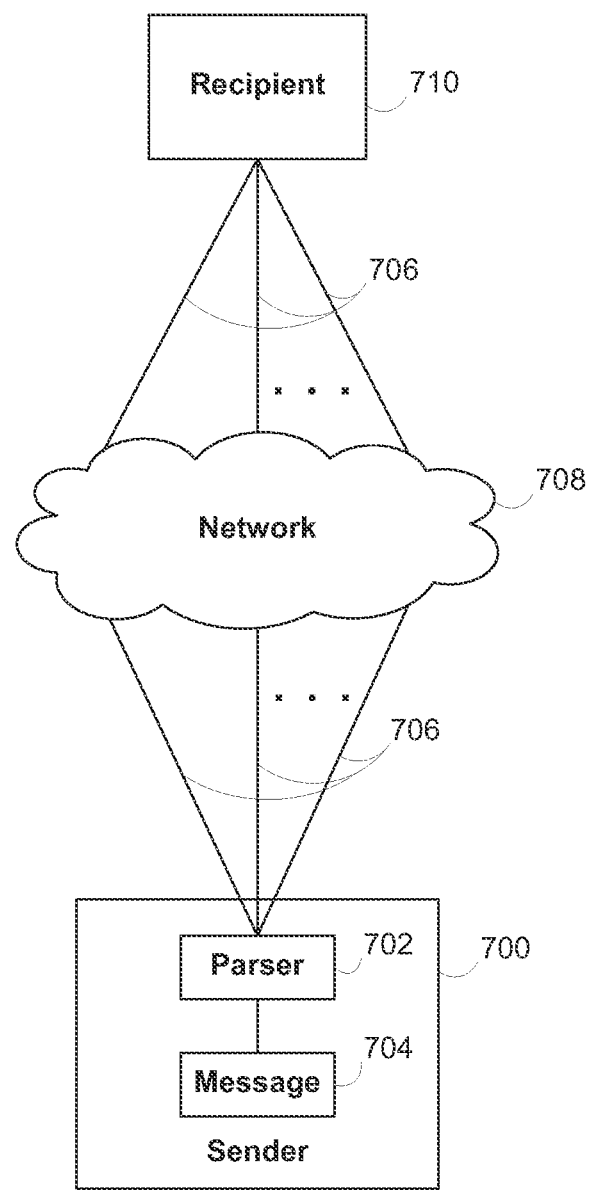
FIG. 7 is a block diagram of an illustrative data in motion system in accordance with one embodiment of the present invention.
Figure 8:
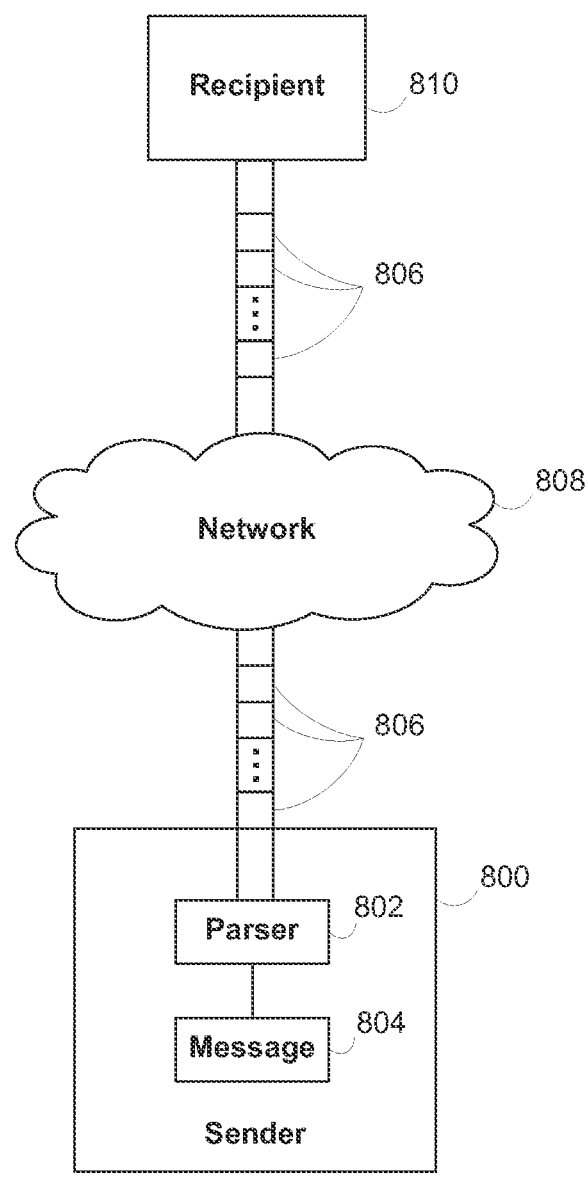
FIG. 8 is a block diagram of another illustrative data in motion system in accordance with one embodiment of the present invention.

FIGS. 7 and 8 are illustrative block diagrams of such email systems. FIG. 7 shows a sender system 700, which may include any suitable hardware, such as a computer terminal, personal computer, handheld device (e.g., PDA, Blackberry), cellular telephone, computer network, any other suitable hardware, or any combination thereof. Sender system 700 is used to generate and/or store a message 704, which may be, for example, a network packet, an email message, a binary data file (e.g., graphics, voice, video, etc.), or any combination of the foregoing. Message 704 is parsed and split by secure data parser 702 in accordance with the present invention. The resultant data portions may be communicated across one or more separate communications paths 706 over network 708 (e.g., the Internet, an intranet, a LAN, WiFi, Bluetooth, any other suitable hard-wired or wireless communications means, or any combination thereof) to recipient system 710. The data portions may be communicated parallel in time or alternatively, according to any suitable time delay between the communication of the different data portions. Recipient system 710 may be any suitable hardware as described above with respect to sender system 700. The separate data portions carried along communications paths 706 are recombined at recipient system 710 to generate the original message or data in accordance with the present invention.

FIG. 8 shows a sender system 800, which may include any suitable hardware, such as a computer terminal, personal computer, handheld device (e.g., PDA), cellular telephone, computer network, any other suitable hardware, or any combination thereof. Sender system 800 is used to generate and/or store a message 804, which may be, for example, a network packet, an email message, a binary data file (e.g., graphics, voice, video, etc.), or any combination of the foregoing. Message 804 is parsed and split by secure data parser 802 in accordance with the present invention. The resultant data portions may be communicated across a single communications paths 806 over network 808 (e.g., the Internet, an intranet, a LAN, WiFi, Bluetooth, any other suitable communications means, or any combination thereof) to recipient system 810. The data portions may be communicated serially across communications path 806 with respect to one another. Recipient system 810 may be any suitable hardware as described above with respect to sender system 800. The separate data portions carried along communications path 806 are recombined at recipient system 810 to generate the original message or data in accordance with the present invention.

It will be understood that the arrangement of FIGS. 7 and 8 are merely illustrative. Any other suitable arrangement may be used. For example, in another suitable approach, the features of the systems of FIGS. 7 and 8 may be combined whereby the multi-path approach of FIG. 7 is used and in which one or more of communications paths 706 are used to carry more than one portion of data as communications path 806 does in the context of FIG. 8.

The secure data parser may be integrated at any suitable level of a data-in motion system. For example, in the context of an email system, the secure parser may be integrated at the user-interface level (e.g., into Microsoft® Outlook), in which case the user may have control over the use of the secure data parser features when using email. Alternatively, the secure parser may be implemented in a back-end component such as at the exchange server, in which case messages may be automatically parsed, split, and communicated along different paths in accordance with the present invention without any user intervention. In some embodiments, the integration may be transparent to the user.

Similarly, in the case of streaming broadcasts of data (e.g., audio, video), the outgoing data may be parsed and separated into multiple streams each containing a portion of the parsed data. The multiple streams may be transmitted along one or more paths and recombined at the recipient's location in accordance with the present invention. One of the benefits of this approach is that it avoids the relatively large overhead associated with traditional encryption of data followed by transmission of the encrypted data over a single communications channel. The secure parser of the present invention allows data in motion to be sent in multiple parallel streams, increasing speed and efficiency.

It will be understand that the secure data parser may be integrated for protection of and fault tolerance of any type of data in motion through any transport medium, including, for example, wired, wireless, or physical. For example, voice over Internet protocol (VoIP) applications may make use of the secure data parser of the present invention. Wireless or wired data transport from or to any suitable personal digital assistant (PDA) devices such as Blackberries and Smart-Phones may be secured using the secure data parser of the present invention. Communications using wireless 802.11 protocols for peer to peer and hub based wireless networks, satellite communications, point to point wireless communications, Internet client/server communications, or any other suitable communications may involve the data in motion capabilities of the secure data parser in accordance with the present invention. Data communication between computer peripheral device (e.g., printer, scanner, monitor, keyboard, network router, biometric authentication device (e.g., fingerprint scanner), or any other suitable peripheral device) between a computer and a computer peripheral device, between a computer peripheral device and any other suitable device, or any combination thereof may make use of the data in motion features of the present invention.

The data in motion features of the present invention may also apply to physical transportation of secure shares using for example, separate routes, vehicles, methods, any other suitable physical transportation, or any combination thereof. For example, physical transportation of data may take place on digital/magnetic tapes, floppy disks, optical disks, physical tokens, USB drives, removable hard drives, consumer electronic devices with flash memory (e.g., Apple IPODs or other MP3 players), flash memory, any other suitable medium used for transporting data, or any combination thereof.

The secure data parser of the present invention may provide security with the ability for disaster recovery. According to the present invention, fewer than all portions of the separated data generated by the secure data parser may be necessary in order to retrieve the original data. That is, out of m portions stored, n may be the minimum number of these m portions necessary to retrieve the original data, where n<=m. For example, if each of four portions is stored in a different physical location relative to the other three portions, then, if n=2 in this example, two of the locations may be compromised whereby data is destroyed or inaccessible, and the original data may still be retrieved from the portions in the other two locations. Any suitable value for n or m may be used.

In addition, the n of m feature of the present invention may be used to create a "two man rule" whereby in order to avoid entrusting a single individual or any other entity with full access to what may be sensitive data, two or more distinct entities, each with a portion of the separated data parsed by the secure parser of the present invention may need to agree to put their portions together in order to retrieve the original data.

The secure data parser of the present invention may be used to provide a group of entities with a group-wide key that allows the group members to access particular information authorized to be accessed by that particular group. The group key may be one of the data portions generated by the secure parser in accordance with the present invention that may be required to be combined with another portion centrally stored, for example in order to retrieve the information sought. This feature allows for, for example, secure collaboration among a group. It may be applied in for example, dedicated networks, virtual private networks, intranets, or any other suitable network.

Specific applications of this use of the secure parser include, for example, coalition information sharing in which, for example, multi-national friendly government forces are given the capability to communicate operational and otherwise sensitive data on a security level authorized to each respective country over a single network or a dual network (i.e., as compared to the many networks involving relatively substantial manual processes currently used). This capability is also applicable for companies or other organizations in which information needed to be known by one or more specific individuals (within the organization or without) may be communicated over a single network without the need to worry about unauthorized individuals viewing the information.

Another specific application includes a multi-level security hierarchy for government systems. That is, the secure parser of the present invention may provide for the ability to operate a government system at different levels of classified information (e.g., unclassified, classified, secret, top secret) using a single network. If desired, more networks may be used (e.g., a separate network for top secret), but the present invention allows for substantially fewer than current arrangement in which a separate network is used for each level of classification.

It will be understood that any combination of the above described applications of the secure parser of the present invention may be used. For example, the group key application can be used together with the data in motion security application (i.e., whereby data that is communicated over a network can only be accessed by a member of the respective group and where, while the data is in motion, it is split among multiple paths (or sent in sequential portions) in accordance with the present invention).

The secure data parser of the present invention may be integrated into any middleware application to enable applications to securely store data to different database products or to different devices without modification to either the applications or the database. Middleware is a general term for any product that allows two separate and already existing programs to communicate. For example, in one suitable approach, middleware having the secure data parser integrated, may be used to allow programs written for a particular database to communicate with other databases without custom coding.

The secure data parser of the present invention may be implemented having any combination of any suitable capabilities, such as those discussed herein. In some embodiments of the present invention, for example, the secure data parser may be implemented having only certain capabilities whereas other capabilities may be obtained through the use of external software, hardware, or both interfaced either directly or indirectly with the secure data parser.

The secure data parser of the present invention may be advantageously used in a number of applications and technologies. For example, email system, RAID systems, video broadcasting systems, database systems, tape backup systems, or any other suitable system may have the secure data parser integrated at any suitable level. As previously discussed, it will be understand that the secure data parser may also be integrated for protection and fault tolerance of any type of data in motion through any transport medium, including, for example, wired, wireless, or physical transport mediums. As one example, voice over Internet protocol (VoIP) applications may make use of the secure data parser of the present invention to solve problems relating to echoes and delays that are commonly found in VoIP. The need for network retry on dropped packets may be eliminated by using fault tolerance, which guarantees packet delivery even with the loss of a predetermined number of shares. Packets of data (e.g., network packets) may also be efficiently split and restored "on-the-fly" with minimal delay and buffering, resulting in a comprehensive solution for various types of data in motion. The secure data parser may act on network data packets, network voice packets, file system data blocks, or any other suitable unit of information. In addition to being integrated with a VoIP application, the secure data parser may be integrated with a file-sharing application (e.g., a peer-to-peer file-sharing application), a video broadcasting application, an electronic voting or polling application (which may implement an electronic voting protocol and blind signatures, such as the Sensus protocol), an email application, or any other network application that may require or desire secure communication.

Figure 9:
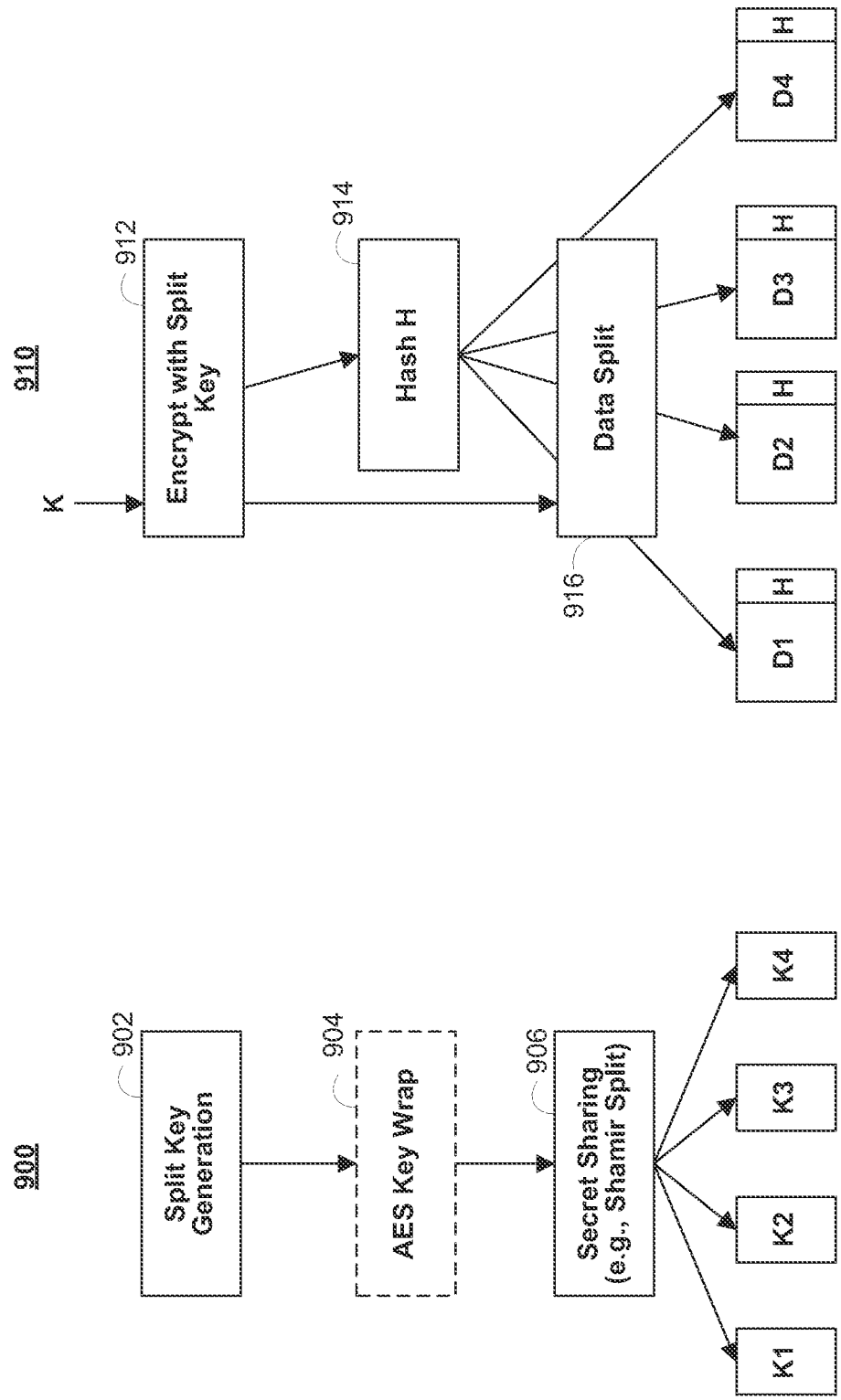
FIGS. 9A and 9B are simplified and illustrative process flow diagrams for header generation and data splitting for data in motion, that may be used in any suitable combination, with any suitable additions, deletions, or modifications in accordance with one embodiment of the present invention.

In some embodiments, support for network data in motion may be provided by the secure data parser of the present invention in two distinct phases—a header generation phase and a data partitioning phase. Simplified header generation process 900 and simplified data partitioning process 910 are shown in FIGS. 9A and 9B, respectively. One or both of these processes may be performed on network packets, file system blocks, or any other suitable information.

In some embodiments, header generation process 900 shown in FIG. 9A may be performed one time at the initiation of a network packet stream. At step 902, a random (or pseudo-random) split encryption key, K, may be generated. The split encryption key, K, may then be optionally encrypted (e.g., using the workgroup key described above) at AES key wrap step 904. Although an AES key wrap may be used in some embodiments, any suitable key encryption or key wrap algorithm may be used in other embodiments. AES key wrap step 904 may operate on the entire split encryption key, K, or the split encryption key may be parsed into several blocks (e.g., 64-bit blocks). AES key wrap step 904 may then operate on blocks of the split encryption key, if desired.

At step 906, a secret sharing algorithm (e.g., Shamir) may be used to split the split encryption key, K, into key shares. Each key share may then be embedded into one of the output shares (e.g., in the share headers). Finally, a share integrity block and (optionally) a post-authentication tag (e.g., MAC) may be appended to the header block of each share. Each header block may be designed to fit within a single data packet.

After header generation is complete (e.g., using simplified header generation process 900), the secure data parser may enter the data partitioning phase shown in FIG. 9B using simplified data splitting process 910. Each incoming data packet or data block in the stream is encrypted using the split encryption key, K, at step 912. At step 914, share integrity information (e.g., a hash H) may be computed on the resulting ciphertext from step 912. For example, a SHA-256 hash may be computed. At step 916, the data packet or data block may then be partitioned into two or more data shares using one of the data splitting algorithms described above in accordance with the present invention. In some embodiments, the data packet or data block may be split so that each data share contains a substantially random distribution of the encrypted data packet or data block. The integrity information (e.g., hash H) may then be appended to each data share. An optional post-authentication tag (e.g., MAC) may also be computed and appended to each data share in some embodiments.

Each data share may include metadata, which may be necessary to permit correct reconstruction of the data blocks or data packets. This information may be included in the share header. The metadata may include such information as cryptographic key shares, key identities or identifiers, share nonces, signatures/MAC values, and integrity blocks. In order to maximize bandwidth efficiency, the metadata may be stored in a compact binary format.

For example, in some embodiments, the share header may include a cleartext header chunk, which is not encrypted and may include such elements as the Shamir key share, per-session nonce, per-share nonce, and key identifiers (e.g., a workgroup key identifier and a post-authentication key identifier). The share header may also include an encrypted header chunk, which is encrypted using the split encryption key. An integrity header chunk, which may include integrity checks for any number of the previous blocks (e.g., the previous two blocks) may also be included in the header. Any other suitable values or information may also be included in the share header in other embodiments.

Figure 10:
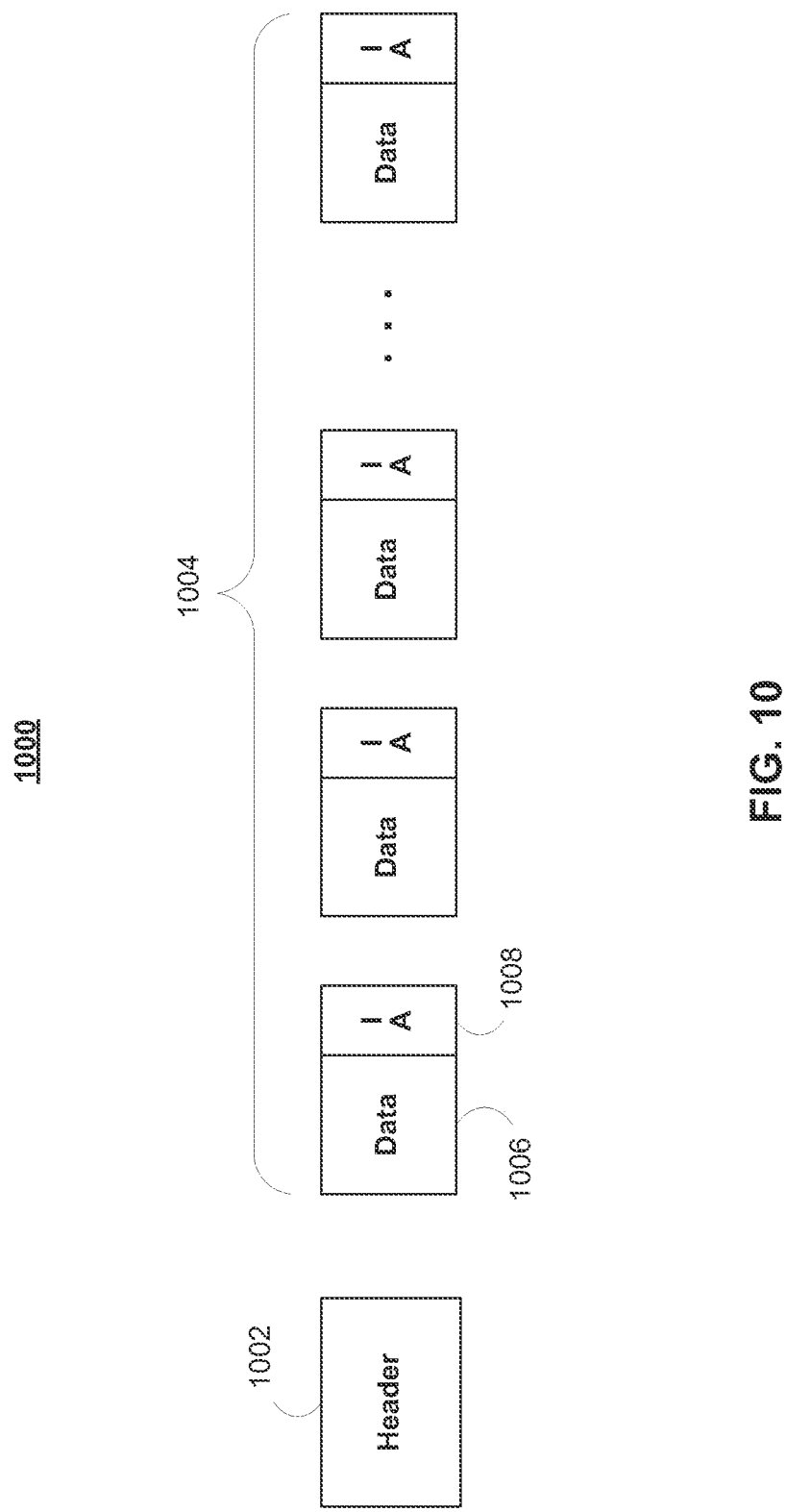
FIG. 10 is a simplified block diagram of an illustrative share format, that may be used in any suitable combination, with any suitable additions, deletions, or modifications in accordance with one embodiment of the present invention.

As shown in illustrative share format 1000 of FIG. 10, header block 1002 may be associated with two or more output blocks 1004. Each header block, such as header block 1002, may be designed to fit within a single network data packet. In some embodiments, after header block 1002 is transmitted from a first location to a second location, the output blocks may then be transmitted. Alternatively, header block 1002 and output blocks 1004 may be transmitted at the same time in parallel. The transmission may occur over one or more similar or dissimilar communications paths.

Each output block may include data portion 1006 and integrity/authenticity portion 1008. As described above, each data share may be secured using a share integrity portion including share integrity information (e.g., a SHA-256 hash) of the encrypted, pre-partitioned data. To verify the integrity of the outputs blocks at recovery time, the secure data parser may compare the share integrity blocks of each share and then invert the split algorithm. The hash of the recovered data may then be verified against the share hash.

As described above, the secure data parser of the present invention may also be used to secure data in motion (or data being communicated from one system or service to another) within a workgroup. In some embodiments, a centralized server handles all user, service, and workgroup management for a single domain (or across multiple domains). The centralized server may include one server or a cluster of servers (for fault-tolerance) and may include an LDAP server, such as a server running Microsoft® Server 2003 and Active Directory.

Figure 11:
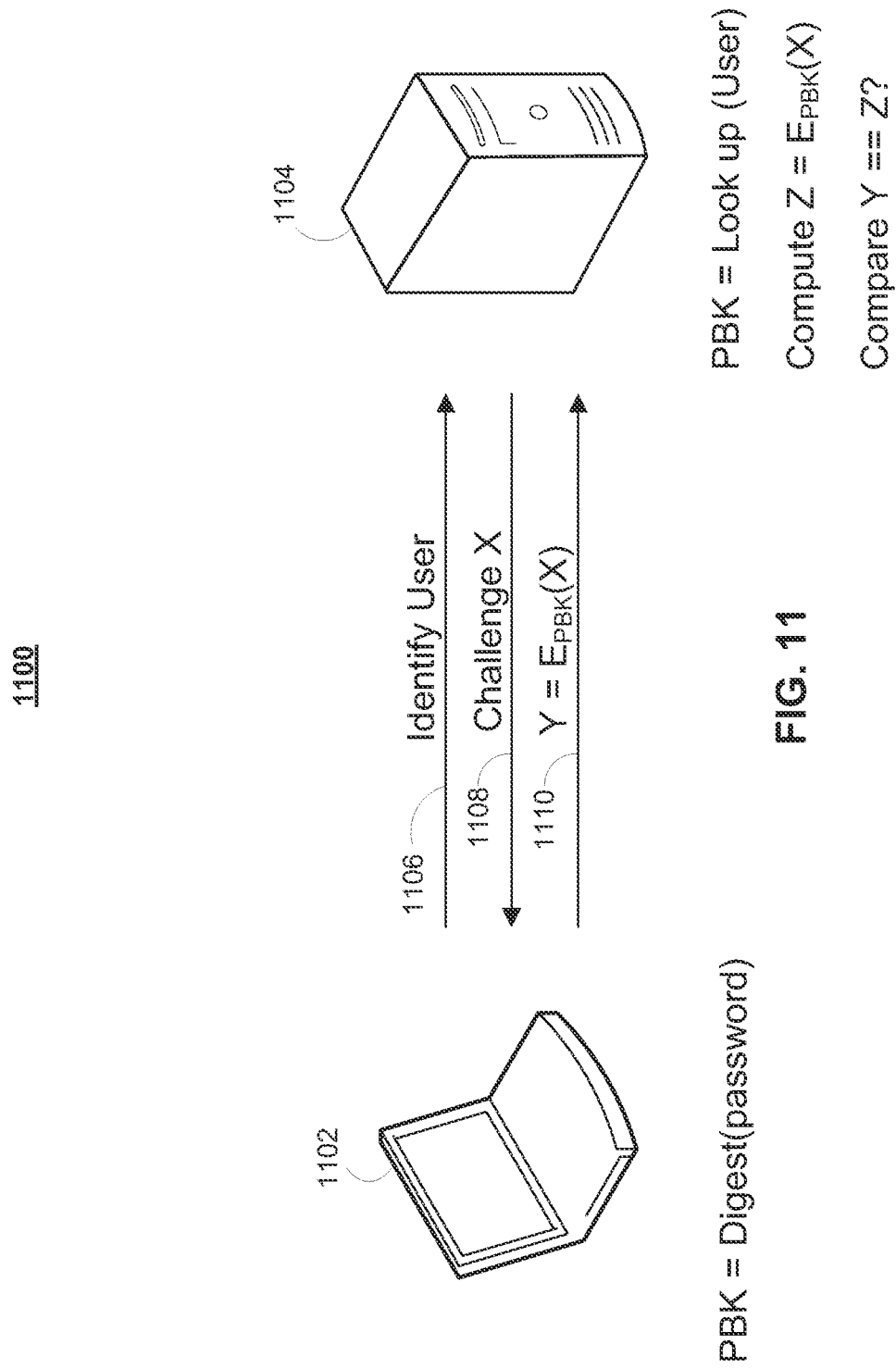
FIG. 11 is a simplified protocol illustrating the message sequence for authenticating a client in a workgroup in accordance with one embodiment of the present invention.

Seamless user authentication within a workgroup may be provided using challenge/response protocol 1100 as shown in FIG. 11. Using protocol 1100, workgroup client 1102 may authenticate itself to authentication server 1104. Seamless user authentication may be granted through the verification of a shared secret (for example, using Digest Authentication). When a user logs onto workgroup client 1102, a password entered by the user may be put through a cryptographic function transforming the ASCII text of the password into a cryptographic key. This password-based key (labeled "PBK" in the example of FIG. 11) may also be stored on, or accessible by, authentication server 1104.

To be authenticated, workgroup client 1102 may identify itself to authentication server 1104 with message 1106. For example, message 1106 may include data indicative of the user's identity, such as, for example, the user's workgroup name, logon username, network address, MAC address, or any combination of the foregoing. In response to message 1106, authentication server 1104 may send workgroup client 1102 a challenge value in message 1108. The challenge value may include any number of bits or bytes which, after received by workgroup client 1102, may be encrypted using the password-based key. The resulting ciphertext (labeled "Y" in the example of FIG. 11) may then be returned to the server in message 1110. Authentication server 1104 may then perform the same encryption on the challenge value using the stored password-based key for the workgroup client and verify that its own encryption and the received ciphertext match. If there is a match, the user has been authenticated. Otherwise, the authentication request may be denied.

Figure 12:
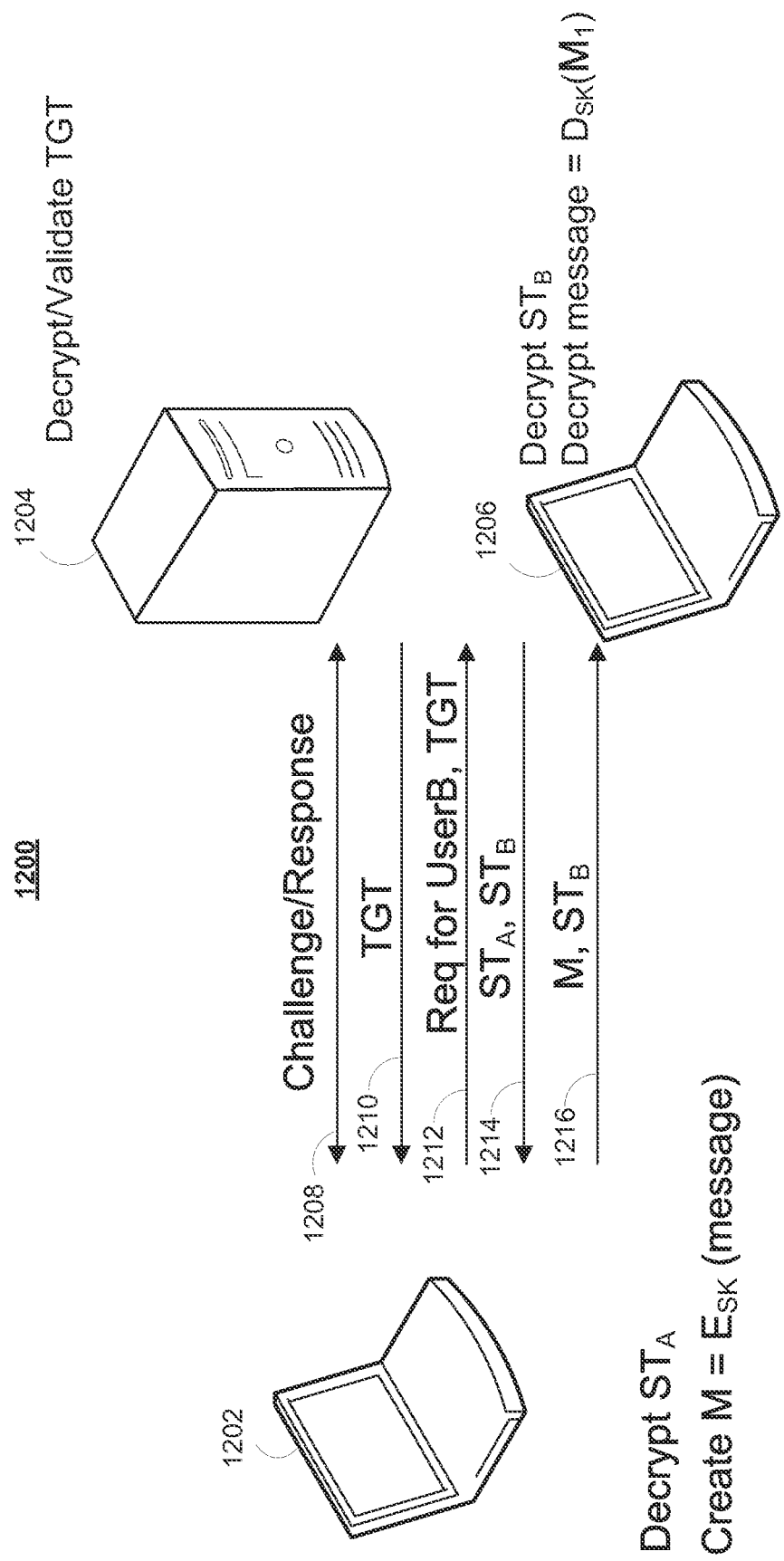
FIG. 12 is a simplified protocol illustrating the message sequence for obtaining service tickets in a workgroup in accordance with one embodiment of the present invention.

FIG. 12 shows illustrative process 1200 for communicating with a service on the network. Process 1200 may be implemented using a Kerberos subsystem, which allows two workgroup clients (such as clients 1202 and 1206) on a network to prove their authenticity to one another through the use of a central server sometimes referred to as Key Distribution Center (KDC) 1204.

After being authenticated (e.g., using a challenge/response protocol as shown by messages 1208), a user may be given a Ticket Granting Ticket (TGT) in message 1210. This ticket may serve as a token to be given to KDC 1204 whenever client 1202 intends to communicate with another user or service on the network (such as a web server, email server, or client

1206). The TGT may include, for example, a block of information containing the name or identity of the recipient, a timestamp, and any other necessary credentials. The TGT may also be encrypted under the KDC's Master Key so that only the KDC can read its contents.

When a user with a TGT wants to communicate with a service on the network, it may pass the TGT to the KDC and request a valid Service Ticket (ST). For example, as shown in FIG. 12, workgroup client 1202 has requested a ST for client 1206 via message 1212. If the TGT is valid, KDC 1204 may return to client 1202 two STs via message 1214, each ST containing the credentials of the parties involved in the communication, a timestamp, and a unique and fresh session key (SK) to be used as a temporary shared key between both parties for encryption. One of the STs may be encrypted under the shared password-based key between the user and the KDC, and the other ST may be encrypted under the shared password-based key between the service or client being contacted (e.g., client 1206) and the KDC.

The ST encrypted for client 1202 making the request can immediately be decrypted by client 1202 and the SK uncovered. Client 1202 may then send the second ST and a message encrypted under the SK to the targeted service or client (e.g., client 1206) via message 1216. In a final step, the service or client (e.g., client 1206) may then decrypt the ST with its password-based key to obtain the SK, and subsequently decrypt the message sent by client 1202. Through this process, clients 1202 and 1206 now share the SK.

In practice, one or more steps shown in process 1200 may be combined with other steps, performed in any suitable order, performed in parallel (e.g., simultaneously or substantially simultaneously), or removed.

Figure 13:
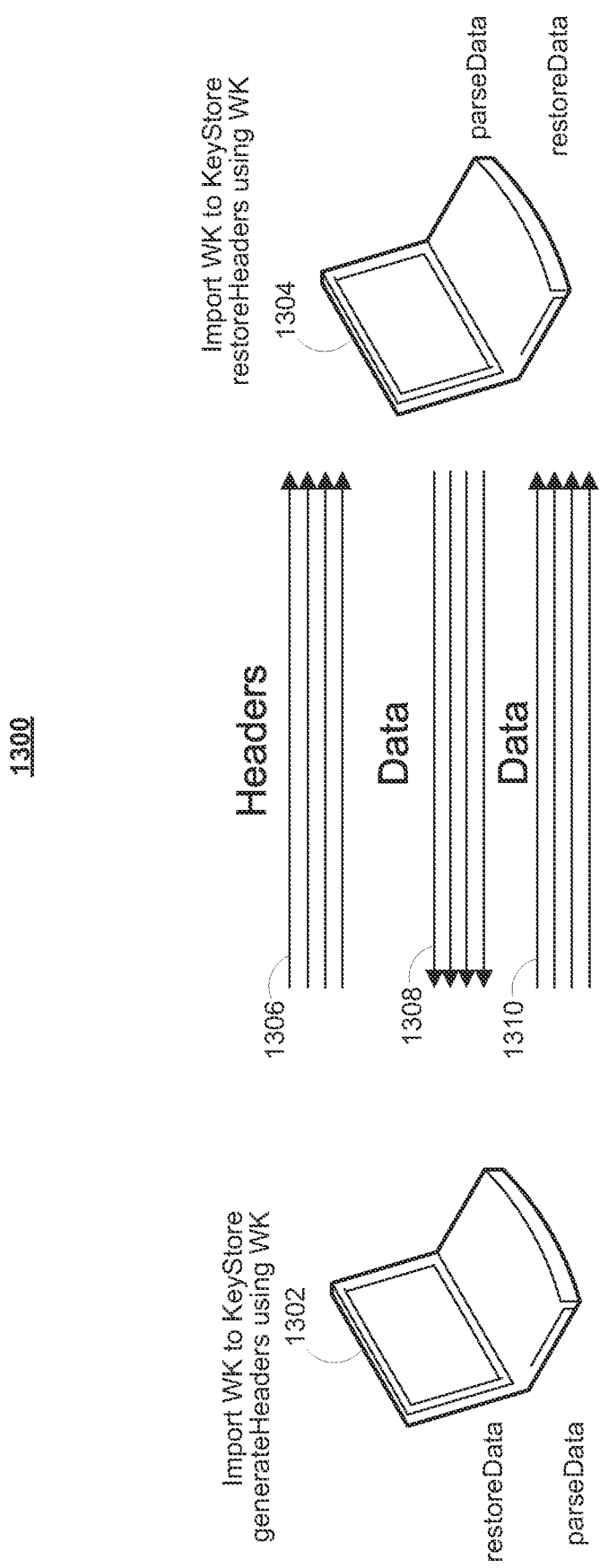
FIG. 13 is a simplified protocol illustrating the message sequence for using a workgroup key to secure data in motion in accordance with one embodiment of the present invention.

FIG. 13 shows illustrative process 1300 for using shared keys with the secure data parser. The SK described above may be used as a shared workgroup key (WK) to support secure workgroup communication using the secure data parser. In some embodiments, the secure data parser WK may be used to wrap internally generated session keys, including the Encryption Session Key (ESK) and the MAC session key (MK), as described in more detail in U.S. Pat. No. 7,391,865 and U.S. patent application Ser. No. 10/458,928, filed Jun. 11, 2003, Ser. No. 11/258,839, filed Oct. 25, 2005, Ser. No. 11/602,667, filed Nov. 20, 2006, Ser. No. 11/983,355, filed Nov. 7, 2007, Ser. No. 11/999,575, filed Dec. 5, 2007, Ser. No. 12/209,703, filed Sep. 12, 2008, and Ser. No. 12/349,897, filed Jan. 7, 2009.

After wrapped with the WK, the ciphertexts may be securely shared (e.g., using a secret sharing scheme, such as Shamir) among each header generated by the secure data parser, where a single share of each wrapped key is stored with each header. Obtaining the ESK or MK may now require obtaining WK and a quorum of shares sufficient to rebuild the wrapped ESK and MK ciphertexts. In some embodiments, the secure data parser WK may be used to wrap an internally generated Encryption Session Key (ESK). Once wrapped with the WK, the ciphertext may be again wrapped with a freshly generated Key Encrypting Key (KEK). Now the ESK has been doubly wrapped and may only be recovered with knowledge of both the WK and the KEK. The KEK may be securely shared among each header generated by the secure data parser, and the doubly wrapped ESK may be stored within each header. Obtaining the ESK now may require obtaining the WK and a quorum of shares sufficient to rebuild the KEK. In a typical communication session, two users or workgroup clients may obtain tickets encrypted only for each client individually, the tickets containing the WK value. The WK value may then be imported in to the KeyStore for each of the two users or clients and used as a normal WK in the context of a secure data parser communication session.

For example, client 1302 may import a shared WK into its KeyStore and generate secure data parser headers, as described above in regard to FIGS. 9 and 10. The secure data parser headers may include one or more of the WK, the workgroup-key ID, and the WK version number (e.g., the WK, key ID, and version number may be shared out to the headers using a secret sharing scheme, such as Shamir, in some embodiments). Client 1302 may then send these headers to client 1304 via messages 1306. Client 1304 may reconstruct the WK, the workgroup-key ID, and the WK version number from received headers and import the WK into its KeyStore. After each client has stored the WK in its respective KeyStore, a secure data parser communications session (e.g., parsing a data set and restoring the data set) may then take place using data messages 1308 and 1310.

In practice, one or more steps shown in process 1300 may be combined with other steps, performed in any suitable order, performed in parallel (e.g., simultaneously or substantially simultaneously), or removed.

Figure 14:
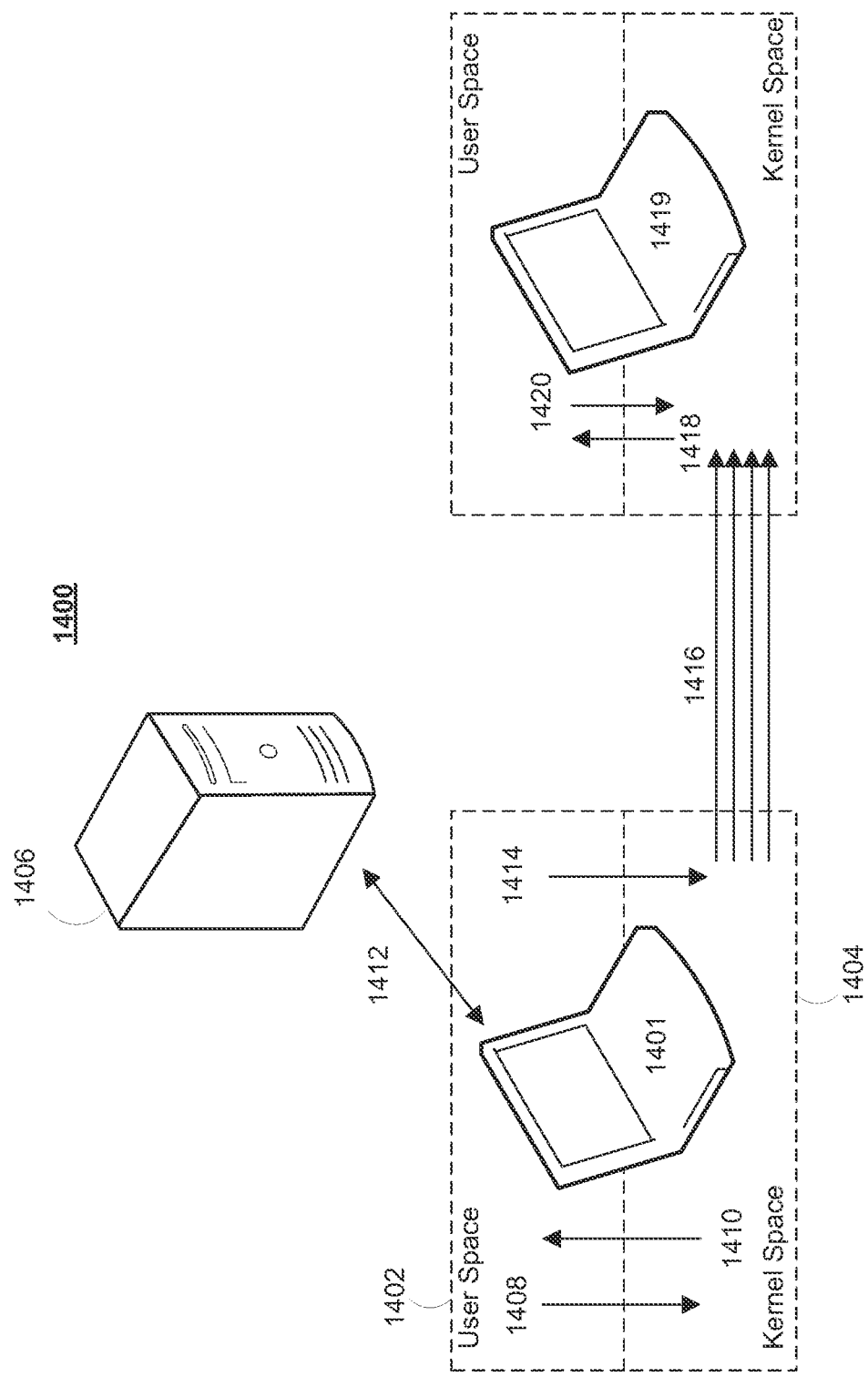
FIG. 14 is a simplified protocol illustrating the message sequence for kernel and user space interaction in accordance with one embodiment of the present invention.

In order for the above mechanisms to be integrated with a kernel-level network driver, in some embodiments, authentication server modifications are provided to distribute the session keys. Workstation modifications may also be provided, in some embodiments, to request TGTs and STs. Process 1400, as shown in FIG. 14, illustrates an exemplary message sequence. For example, Kerberos functionality and communication with KDC 1406 generally cannot occur in kernel space 1404. Instead, the network driver may call back to user space 1402 to perform the Kerberos key exchanges, then pass back down any data that is used by the network driver (or sent to the original destination). For example, after client 1401 wishes to communicate with client 1419, message 1408 may be generated and delivered from user space 1402 to the network driver in kernel space 1404. The network driver may determine whether or not there is already a secure date parser session with the desired destination IP address (or other network identifier), and, if so, may use that channel. If there is no existing session, the network driver may pass the IP address (or other network identifier) up to a user-level service to obtain STs using message 1410.

The service may then determine whether or not the STs for the given IP address (or other network identifier) are currently cached, and, if not, the user-level service may obtain the STs from KDC 1406 via messages 1412. Next, the user-level service may decrypt the embedded WK in the ST for client 1401 and pass the WK and the ST for client 1419 back to the network driver in kernel space 1404 via message 1414. The network driver may then use the WK to generate secure data parser headers and send them, along with the ST for client 1419, to client 1419 via messages 1416. After receiving the headers and the ST at the network driver of client 1419, the ST may then be passed up to its own user-level service via message 1418. The user-level service may decrypt the ST and extract the WK, which is then passed back down to the network driver via message 1420. Client 1419 may then use WK to restore the secure data parser headers it has received and complete the channel.

In practice, one or more steps shown in process 1400 may be combined with other steps, performed in any suitable order, performed in parallel (e.g., simultaneously or substantially simultaneously), or removed.

Figure 15:
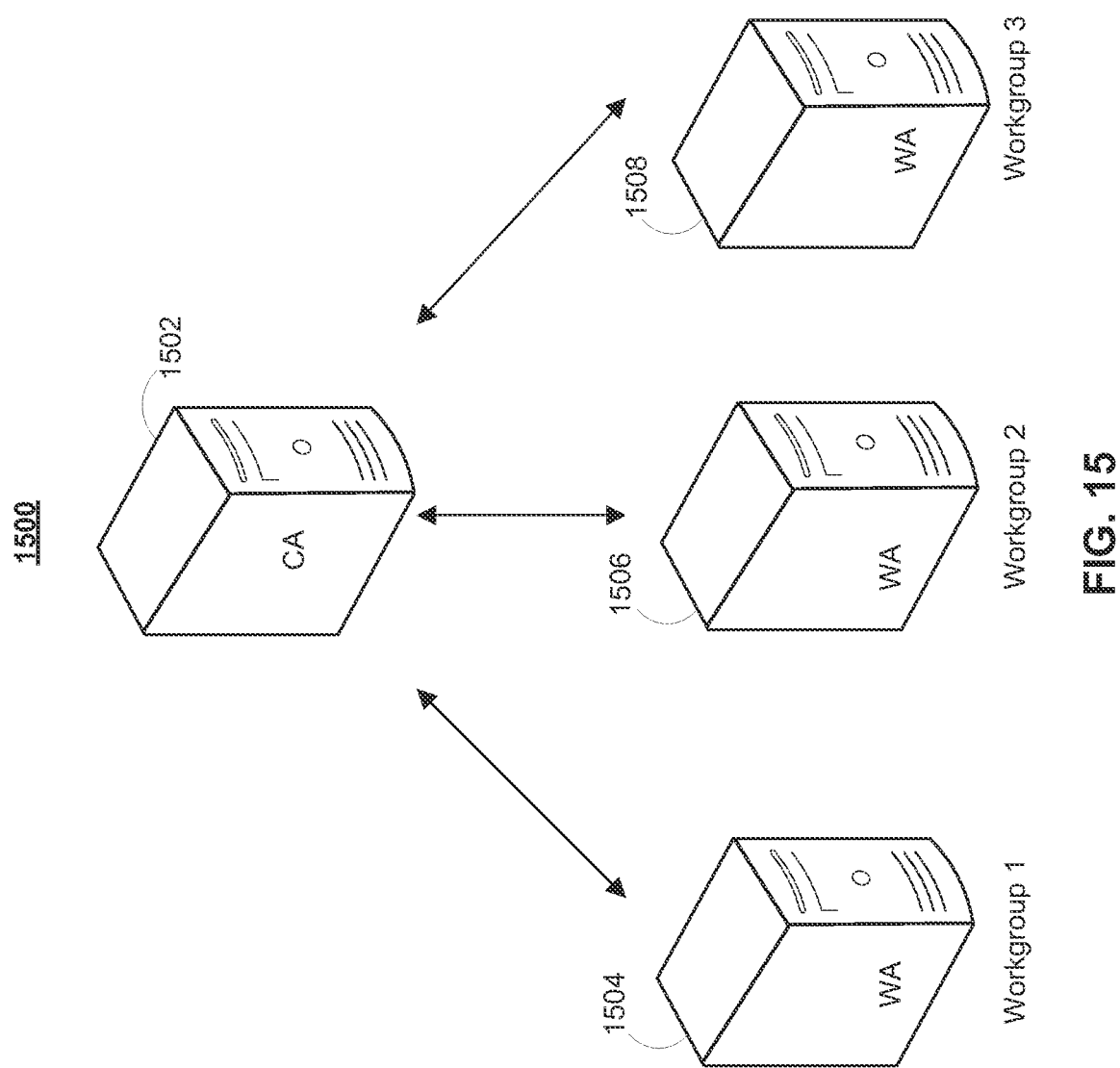
FIG. 15 is a simplified block diagram of the initial setup of Workgroup Authorities within a domain in accordance with one embodiment of the present invention.

FIG. 15 shows illustrative network topology 1500. Certificate Authority (CA) 1502 may enroll each Workgroup Authority (WA) in the network or domain. Although in the example of FIG. 15 three WAs are shown (i.e., WA 1504, WA 1506, and WA 1508), in actual implementations there may be more or less than three WAs in a single network or domain. CA 1502 may enroll each of WA 1504, WA 1506, and WA 1508 by issuing each WA a WA certificate for their respective workgroup. The certificates may be digitally signed by CA 1502 to prevent tampering.

After being enrolled by CA 1602, WA 1504, WA 1506, and WA 1508 may begin enrolling clients (e.g., users, machines, and services) into their respective workgroups. For example, in some embodiments, enrollment may be based, at least in part, on pre-exiting Active Directory (or other LDAP) membership semantics. Enrolled clients may be issued certificates signed by their respective WA, as well as the certificates of the WA, CA, or both.

Figure 16:
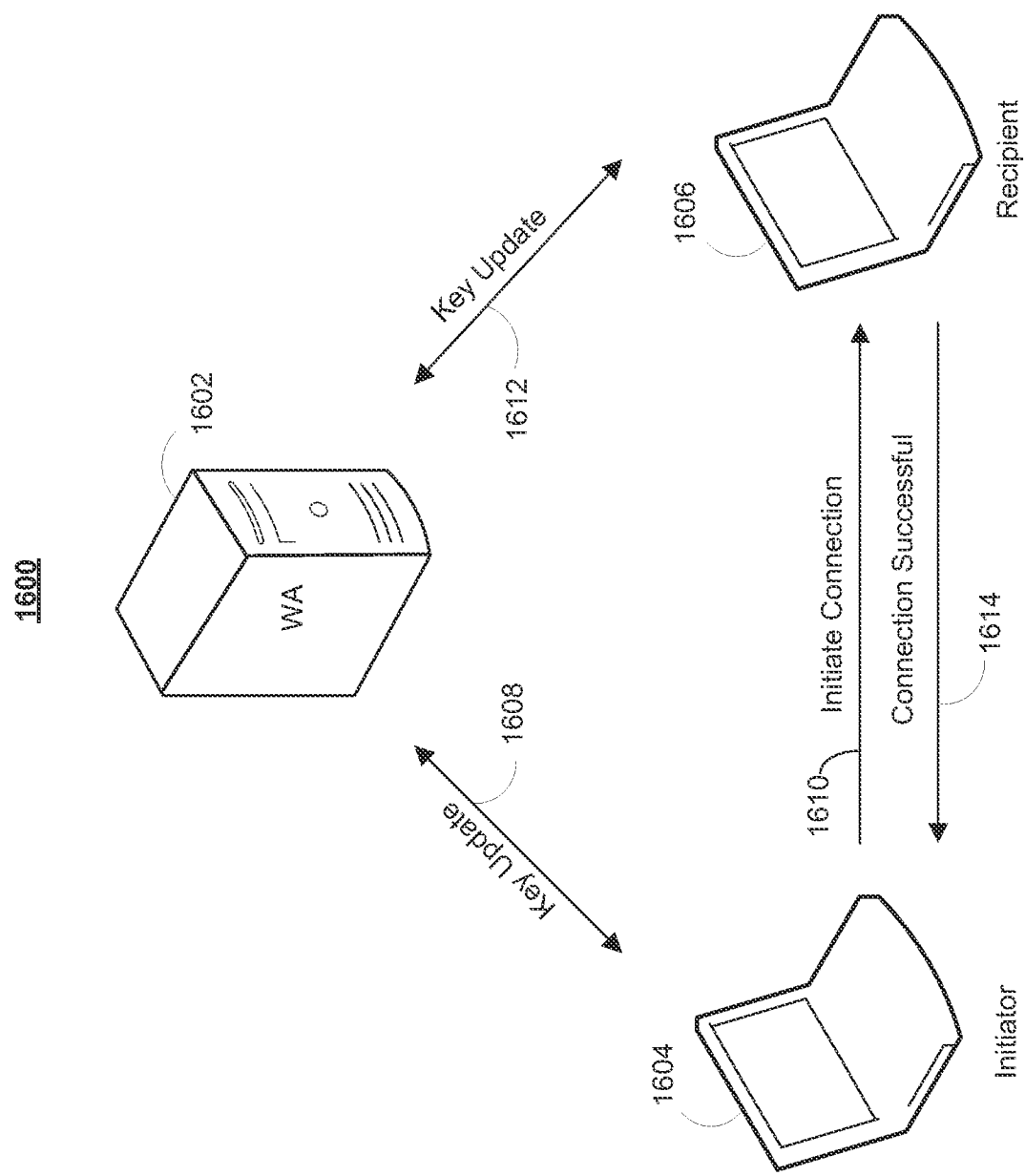
FIG. 16 is a simplified protocol illustrating the connection sequence for two clients within a workgroup in accordance with one embodiment of the present invention.

FIG. 16 shows illustrative connection setup 1600. Initiator 1604 may first ensure that it is using the latest WK by performing key update 1608 with WA 1602. Initiator 1604 may provide a nonce to WA 1602 and prove that it possesses a valid certificate. WA 1602 may then provide an encrypted and signed WK that includes the initiator's nonce. In some embodiments, encryption is performed using RSA PKCS #1 v2 with RSA-PSS or ECDSA signatures. In other embodiments, AES-GCM authenticated encryption is used under pre-shared symmetric keys.

Initiator 1604 then initiates a connection with recipient 1606 using the latest WK with request message 1610. After receiving the connection request, recipient 1606 may ensure that it has the latest WK. Key update 1612 may be performed in the same encrypted, authenticated replay-resistant manner as performed by initiator 1604. If recipient 1606 belongs to more then one workgroup, recipient 1606 selects the appropriate WA based, at least in part, on the workgroup-key ID supplied in request message 1610. If initiator 1604 and recipient 1606 retrieve the same WK from WA 1602, then recipient 1606 may send successful connection message 1614 to initiator 1604.

One or both of the key update steps shown in connection setup 1600 may be performed upon initial connection with another workgroup client, periodically after a workgroup key refresh alarm time has been reached, or periodically on any other suitable schedule. In some embodiments, as described in more detail below, key updates are performed automatically before every new communication session is established. System or user control of the workgroup key TTL and refresh alarm may provide customized levels of renewability. This may be beneficial, for example, after a client's communication privileges have been revoked and immediate revocability is desired.

The need for certificate revocation lists (CRLs) may also be reduced or even altogether eliminated using this approach. Workgroup membership may be maintained by the authentication or LDAP server. In some embodiments, WA revocation is also supported using the Online Certificate Status Protocol (OCSP). For example, an OSCP responder may determine the status of a WA's certificate without checking CRL published by the CA.

In practice, one or more steps shown in connection setup 1700 may be combined with other steps, performed in any suitable order, performed in parallel (e.g., simultaneously or substantially simultaneously), or removed.

Figure 17:
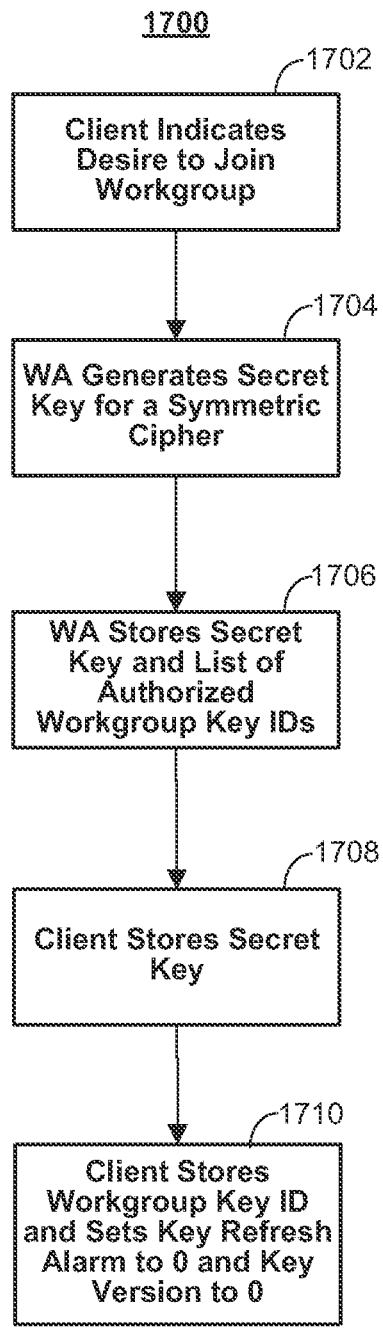
FIG. 17 is an illustrative process flow diagram for joining a workgroup in accordance with one embodiment of the present invention.

FIGS. 17-20 show illustrative processes for supporting the secure workgroup key management and distribution of the present invention. FIG. 17 shows illustrative process 1700 for joining a new workgroup. At step 1702, client n may indicate a desire to join a workgroup. At step 1704, the WA may generate a secret key $E_n$ for the client. In some embodiments, $E_n$ may be a key for a symmetric cipher. In other embodiments, a public-key encryption scheme using an asymmetric cipher may be used and $E_n$ may be a key (e.g., a private key) for an asymmetric cipher. For example, the Naor, Naor and Lotspeich subset cover broadcast encryption approach may be used in place of the symmetric scheme described below. This public-key encryption algorithm may be built on top of any other secure public-key encryption scheme.

Key generation using the public-key approach, in some embodiments, may be performed centrally by the WA. If M is the maximum workgroup size, then the WA may generate 2M−1 distinct public/private keypairs. If a binary tree exists of span M, with each keypair associated with an internal node in the tree, then for each device or client in the workgroup, the $i^{th}$ leaf in the tree could be chosen and the device or client i could be provided with each keypair associated with the $i^{th}$ leaf upward to the root of the tree. The total size of the device or client's key material may then be equal to log M+1. Other approaches for key generation using a public-key or secret key approach may be used in other embodiments.

At step 1706, the WA may store one or more of the identity of the client n, the client's secret key $E_n$, and a list of authorized workgroup-key IDs. At step 1708, client n may store its secret key $E_n$. For example, the client may store its secret key locally in a key store. At step 1710, client n may also store the workgroup-key ID (e.g., public knowledge and/or string identifier) and set the workgroup key refresh alarm to 0 (i.e., immediate) and key version to 0.

A single client may belong to one or more workgroups. Each workgroup (and hence current WK for that workgroup) may be associated with a unique workgroup identifier. The unique workgroup identifiers and associated workgroup-key IDs may help the client and WA determine to which workgroup or workgroups the client currently belongs as well as determine which workgroup key to use to establish a communication session with another client who also belongs to one or more workgroups.

In practice, one or more steps shown in process 1700 may be combined with other steps, performed in any suitable order, performed in parallel (e.g., simultaneously or substantially simultaneously), or removed.

Figure 18A:
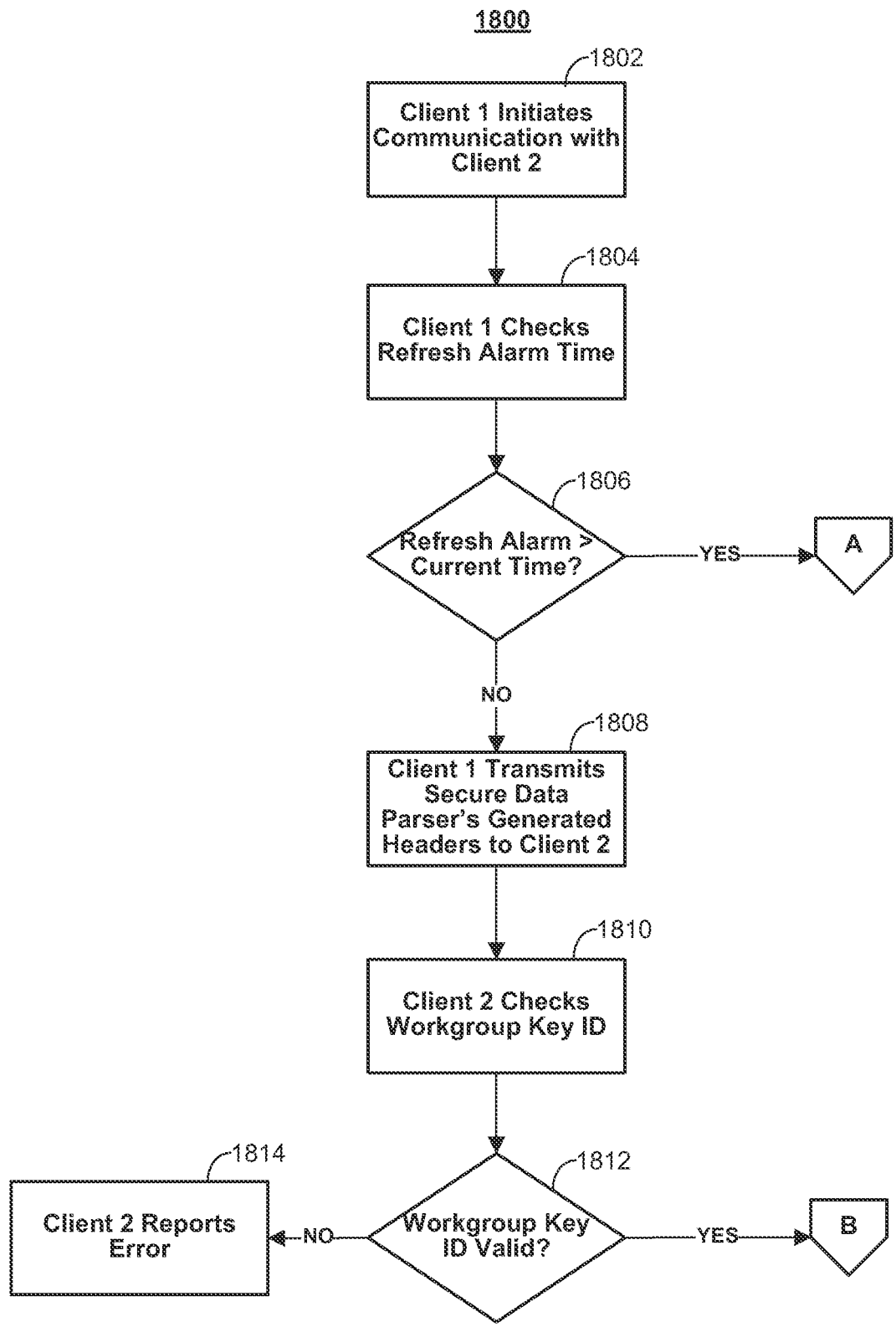
FIGS. 18A, 18B, and 18C are illustrative process flow diagrams for initiating a connection between two workgroup clients in accordance with one embodiment of the present invention.
Figure 18B:
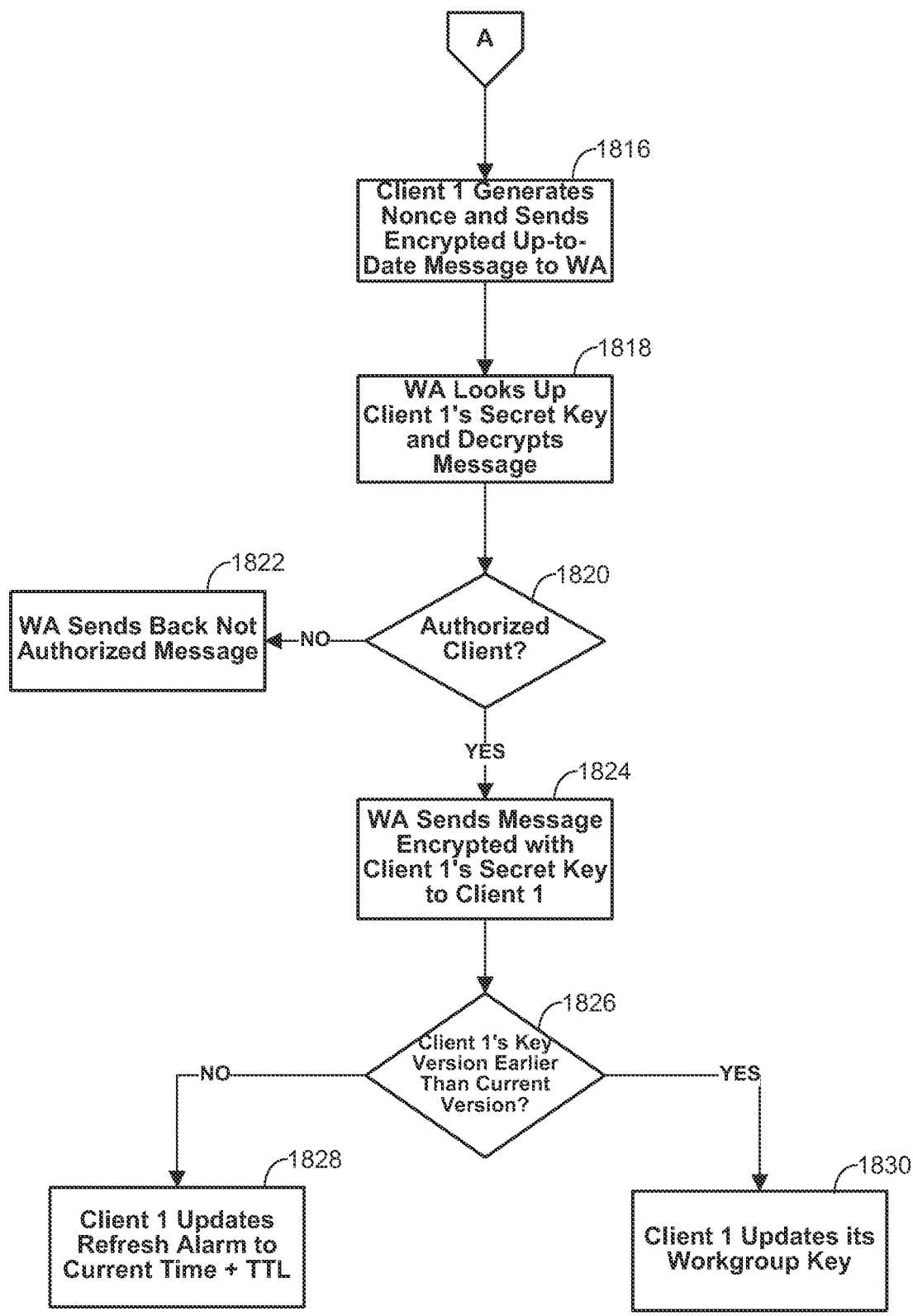
Figure 18C:
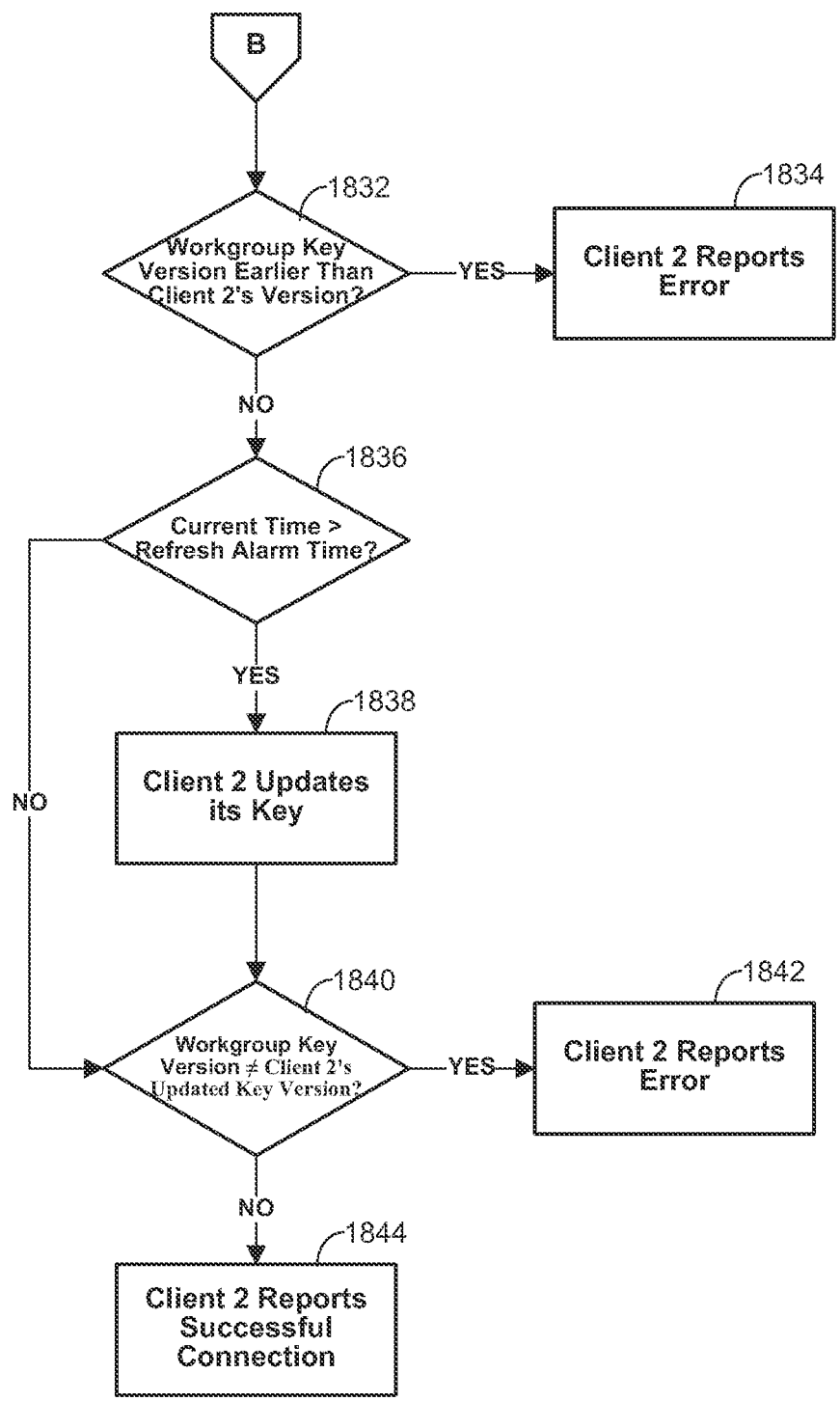

FIGS. 18A, 18B, and 18C show illustrative process 1800 for initiating a connection between two clients. At step 1802, client 1 may initiate a communication session with client 2. For example, client 1 may send its identity (e.g., network address or username) to client 2 and request a communication session with client 1. At step 1804, client 1 may check its workgroup key refresh alarm time. At step 1804, client 1 may also verify that any time to live (TTL) value associated with client 1's WK has not expired. For example, in order to determine if client 1's WK is expired, client 1 may compare the TTL value associated with client 1's WK to the current time or the WK timestamp. The WK timestamp may indicate when the WK was generated or delivered to client 1. If, at step 1806, the refresh alarm time is greater than the current time (or WK timestamp), illustrative process 1800 may continue in FIG. 18B. If, at step 1806, the refresh alarm time is not greater than the current time (or WK timestamp), at step 1808, client 1 may contact client 2 with the secure data parser's generated headers. These headers may include, for example, the WK and WK version number. At step 1810, client 2 may read the workgroup-key ID. If, at step 1812, the workgroup-key ID is not valid for this workgroup (or a workgroup to which client 2 currently belongs), client 2 may report the error to the calling application at step 1814. In some embodiments, the calling application may determine the response to the signaled error. If, at step 1812, the workgroup-key ID is valid for this workgroup (or a workgroup to which client 2 currently belongs), illustrative process 1800 may continue in FIG. 18C.

FIG. 18B continues illustrative process 1800 after it is determined, at step 1806, that the refresh alarm time is greater than the current time (or WK timestamp). In some embodiments, this may indicate a stale WK. In order for client 1 to continue, in some embodiments, it must contact the WA and refresh its WK. At step 1816, client 1 may generate a nonce $N_1$. At step 1816, client 1 may also send a message to the WA. In some embodiments, the message may be formatted as follows: {Client 1∥$E_1${UP-TO-DATE?∥$N_1$∥workgroup-key ID∥client workgroup key version}}, where Client 1 is the identity of client 1, $E_1$ is a cryptographic function based, at least in part, on client 1's secret key, and UP-TO-DATE? is the message type.

At step 1818, the WA may look up client 1 and access $E_1$, client 1's secret key. As previous described, the WA may store each workgroup member's secret key in a key store, key repository, or database. At step 1818, the WA may also decrypt the message sent by client 1 at step 1816. At step 1820, the WA may determine if client 1 is authorized by validating that the received workgroup-key ID is authorized for this client. The WA may also check to see if there is a newer version of the WK and calculate how long until the WK expires (e.g., a "time to live" or TTL value for the WK may be computed). If, at step 1820, the WA determines that the client is not found or not authorized for this workgroup, the WA may send back a not authorized message at step 1822. Otherwise, at step 1824, the WA may send back a message encrypted with client 1's secret key. The message may be in the following format in some embodiments: $E_1${UP-TO-DATE?∥$N_1$∥workgroup-key ID∥current workgroup key version∥TTL}.

At step 1826, client 1 may decrypt the message and compare is WK version with the current WK version. If client 1's WK version is earlier that the current WK version, client 1 may update its WK at step 1830. An illustrative process a client may use to update its WK is described with regard to FIG. 20 below. If client 1's WK version is not earlier than the current WK version (e.g., it is the current version), then client 1 may update its WK refresh alarm to the current time plus the TTL calculated by the WA at step 1828.

Referring now to FIG. 18C, if the workgroup-key ID is valid for the particular workgroup, client 2 may then determine if the version number of client 1's WK is less than client 2's current version number at step 1832. If so, client 2 may report an error to the calling application at step 1834. In some embodiments, the calling application may determine the response to the signaled error (e.g., the calling application may automatically perform a key update to obtain a newer version of the WK and retry the connection). If, at step 1832, client 2 determines that client 1's WK version number is not greater than client 2's version, client 2 may then determine if the current time is greater than the WK refresh alarm time at step 1836. If the current time is greater than the refresh alarm time, client 2 may contact the WA using the UP-TO-DATE? (described above) and/or KEY-REQUEST (described in regard to FIG. 20 below) message types to verify the freshness of the current workgroup key, request a new workgroup key, or both. It should be noted that the UP-TO-DATE? message type may be an optimization for checking that a workgroup key is fresh. Nevertheless, the KEY-REQUEST message type can be used without a preceding UP-TO-DATE? message type in order to reduce latency. In other embodiments, the WA may force clients to check the freshness of keys on every connection attempt by setting the TTL to 0.

After updating its key at step 1838 (or if the current time was not greater than the refresh alarm time at step 1836), client 2 may then determine, at step 1840, if the version number of client 1's WK is not equal to client 2's now up-to-date version number. If the two version numbers are not the same, client 2 may report an error to the calling application at step 1842. If the workgroup-key ID is valid and the version numbers are identical, client 2 may report a successful connection attempt to the calling application at step 1844.

In practice, one or more steps shown in process 1800 may be combined with other steps, performed in any suitable order, performed in parallel (e.g., simultaneously or substantially simultaneously), or removed.

Figure 19:
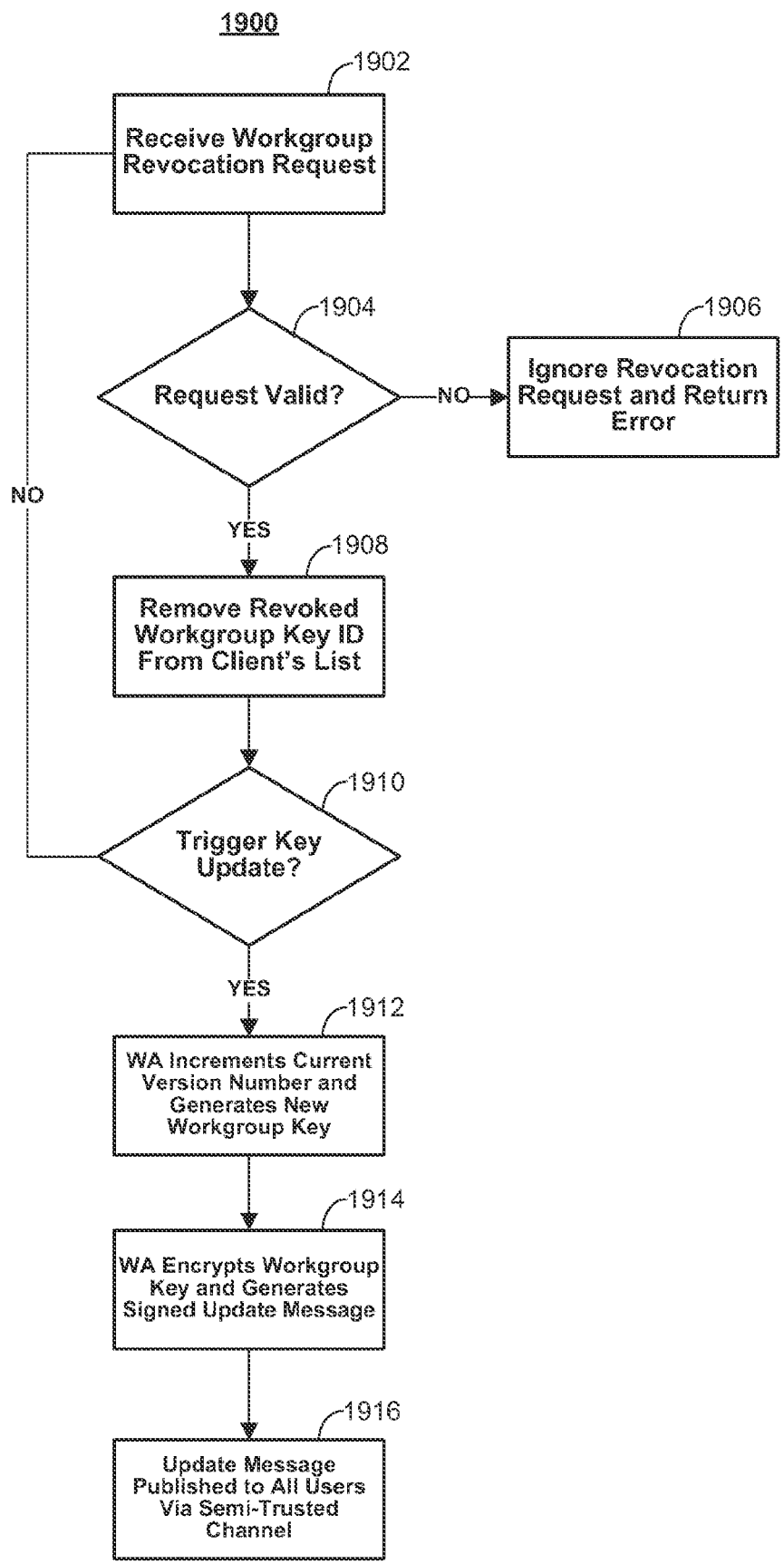
FIG. 19 is an illustrative process flow diagram for revoking a client's communication privileges within a workgroup in accordance with one embodiment of the present invention.

FIG. 19 shows illustrative process 1900 for revoking the communication privileges of a workgroup client. As previously described, traditional secure workgroup communication protocols may require the use of CRLs and may not support immediate revocability and renewability of the workgroup security mechanism. The present invention, however, may support the immediate discovery of revoked clients by renewing the security mechanism periodically (or at every connection attempt). For example, to revoke a workgroup client, the WA may start sending a new WK to all non-revoked users. By using a versioned WK, connections using a stale WK may be refused, depending on the security policy in force at the receiving client.

A workgroup client revocation request may be received at step 1902. For example, one or more users may be removed from a workgroup (or their communication privileges revoked). As previously described, workgroup membership may be maintained by an LDAP (e.g., Microsoft® Active Directory) server in some embodiments. Certain users (e.g., workgroup administrators) may be authorized to remove specific users (or groups of users), machines (e.g., computers and printers), services (e.g., web services and print/file services), or any combination thereof from a workgroup using a workgroup administration interface. At step 1904, the server managing the workgroup membership may determine if the revocation request is valid. Valid revocation requests may be authenticated (e.g., singed) by an authorized user or other entity (e.g., WA or CA) and indicate a valid workgroup user, machine, or service to revoke. If the revocation request is not valid, an error may be returned to the calling application at step 1906 and the revocation request ignored.

If the revocation request is valid at step 1904, however, the revoked workgroup-key ID may be removed from the workgroup client's list at step 1908. For example, the WA may remove the client's workgroup-key ID from a workgroup-key ID table in a relational database stored at the WA or CA. At step 1910, the WA may determine if a key update should be triggered. In some embodiments, at step 1910, a key update is automatically triggered in response to each valid revocation request. In other embodiments, key updates may be triggered only after a predetermined number of valid revocation requests (as defined by the workgroup security policy), a predetermined number of currently outstanding revoked clients, periodically after a predetermined length of time since the last key update, on-demand by the WA or an authorized user, automatically after one or more users leave the workgroup, or at any combination of the foregoing times. Triggering a key update may implicitly deny access to all revoked users because the revoked users may not have access to the new WK. Communication using stale WKs may be controlled, limited, or completely prohibited by customizing WK version numbers, TTL values computed by the WA, and WK refresh alarm times.

If a key update is not triggered at step 1910, illustrative process 1900 may return to step 1902 to await another revocation request. If a key update is triggered at step 1910, the WA may increment its current WK version number and generate a new WK at step 1912. To generate a new WK, in some embodiments, the WA may evaluate the workgroup name and current update number using its Master Key Generation Key (MKGK) through a secure Key Derivation Function (KDF). Other approaches for generating a new WK may be used in other embodiments. The newly generated WK may then be encrypted by the WA and a signed key update message may be generated at step 1914. In some embodiments, the key update message generated at step 1914 may include some or all of the following fields: (1) WA Identifier and Certificate Field, which may include identifying information for the WA authoring the update, including its CA-signed certificate; (2) Workgroup Identifier Field, which may include a unique identifier specifying the name of the workgroup to which this update applies; (3) Sequence Identifier Field, which may include a sequential counter indicating the number of the update; (4) Update Time Period Field, which may include an indication of the time period during which the key material will be valid; (5) Update Payload Field, which may include a ciphertext containing the updated key material; (6) Auxiliary Data Field, which may include additional information required by the client (e.g., a key policy and the location where further updates may be found); (7) Re-keying Flag, which, when set, may instruct the client to regenerate its secret key and contact the WA for re-certification; and (8) Signature Filed, which may include a digital signature computed over the previous fields using the WA's signing key.

If a public-key scheme is used, the key update message may be encrypted to all of the non-revoked users by marking each leaf in the binary tree described above in regard to FIG. 17 according to whether the device at that position has been revoked. Then, all nodes which are parents (or coexistent) to the leaves associated with non-revoked devices may be identified (but not revoked ones). For example, the root of the full tree is parent to all of the leaves; thus, this node is sufficient when no devices are revoked. Next, the message may be encrypted under each of the keys associated with those nodes. The result may include a list identifying these nodes, as well as a list of the ciphertexts produced. When this encryption scheme is used, each non-revoked user may possess at least one of the keypairs that was used to encrypt the message. It may identify this keypair, decrypt the appropriate ciphertext, and output the message.

After the key update message has been generated, it may be published to all non-revoked users via a semi-trusted channel (e.g., website) at step 1916. Untethered (and semi-tethered) operation may also be supported. When a client or device is prepared to go offline, the WA may pre-provision the client or device with key updates for a limited number of future time periods. Additionally or alternatively, for devices with some network access, key revocation and key update messages may be posted to a highly-available location, e.g., a TLS-secured public website.

In practice, one or more steps shown in process 1900 may be combined with other steps, performed in any suitable order, performed in parallel (e.g., simultaneously or substantially simultaneously), or removed.

Figure 20:
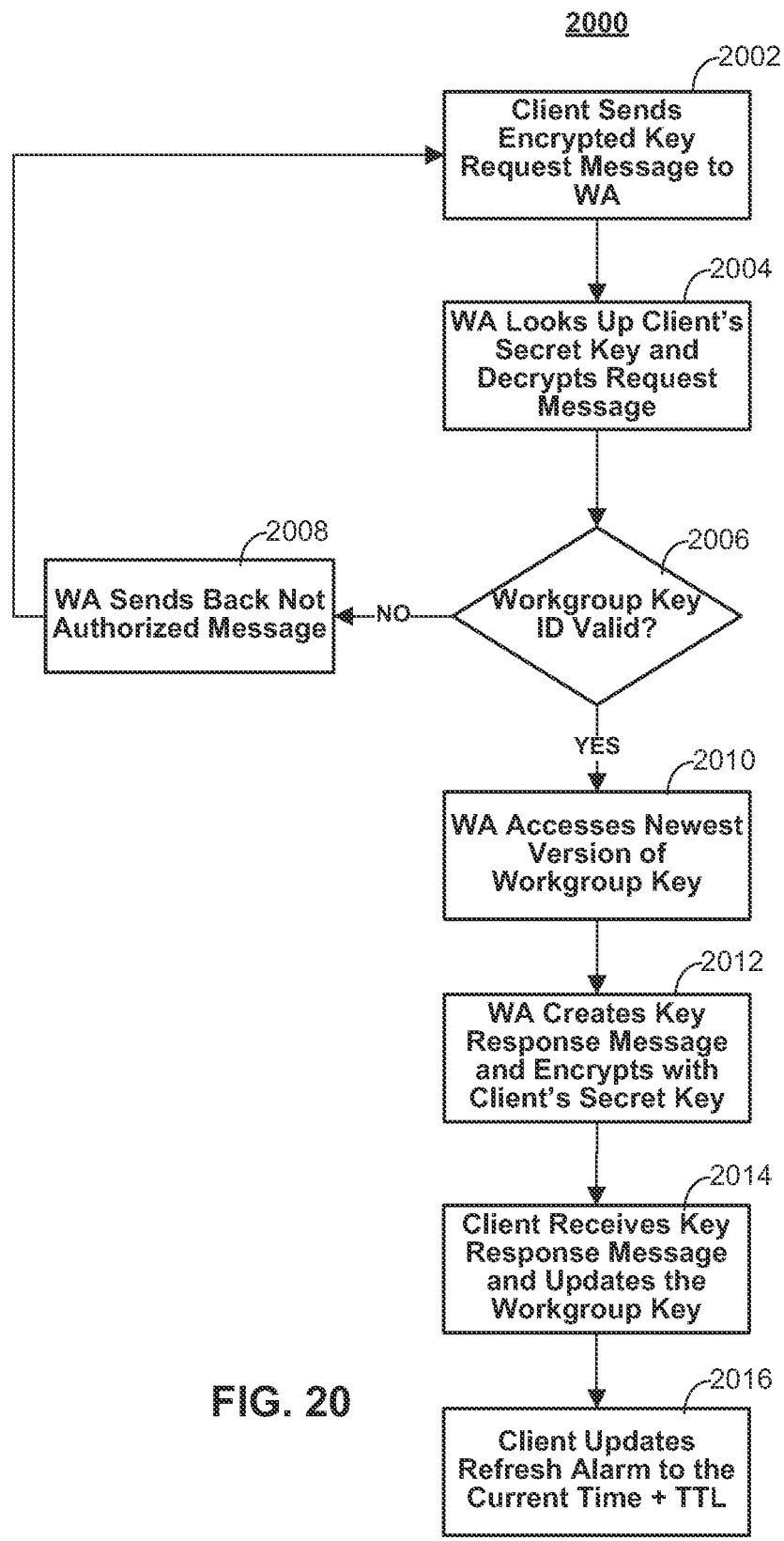
FIG. 20 is an illustrative process flow diagram for updating a workgroup key in accordance with one embodiment of the present invention.

FIG. 20 shows illustrative process 2000 for requesting a WK update. At step 2002, a client may send the WA a key request message encrypted with the client's secret key (or private key, if an asymmetric encryption scheme is used). For example, at step 2002, the client may send a message in the following format to the WA: {Client X∥$E_X${KEY-REQUEST∥$N_2$∥workgroup-key ID∥requested key version}}, where X is the identity of the requesting client, $E_X$ is client X's secret key (or private key, if an asymmetric encryption scheme is used), KEY-REQUEST represents the key request message type, and $N_2$ is a nonce generated by the requesting client. At step 2004, the WA may receive the encrypted message and look up the client to obtain the client's secret encryption key $E_X$. At step 2004, the WA may also decrypt the key request message and, at step 2006, verify that the workgroup-key ID is valid for this client. If the workgroup-key ID is not valid for this client, at step 2008 the WA may send back a not authorized message and illustrative process 2000 may return to step 2002. If the workgroup-key ID is valid for this client, however, the WA may access the newest (i.e., most current) version of the key (it may be newer than the version requested). The WA may then create a response to the key request message at step 2012 and encrypt the response using the client's secret key $E_X$. In some embodiments, the WA's response to the key request message may take the following format: $E_X${KEY-REQUEST∥$N_2$∥workgroup-key ID∥current key version∥TTL∥key}. After receiving the response from the WA, the client may update its WK at step 2014. Finally, at step 2016, the client may update its WK refresh alarm time to the current time plus the received TTL value.

In practice, one or more steps shown in process 2000 may be combined with other steps, performed in any suitable order, performed in parallel (e.g., simultaneously or substantially simultaneously), or removed.

A number of key distribution systems and protocols (e.g., the Kerberos protocol) have been developed that support key distribution in a reasonably efficient manner. However, these prior systems and protocols fail to meet the requirements for secure workgroup key distribution and management for use in securing data in motion in conjunction with the secure data parser of the present invention. Some of these requirements may include, for example: (1) Identification Unavailable For Connection—The system should support communication between two clients when one or both do not have the full identity of the other. An immediate consequence of this requirement may be to exclude per-peer session keys; (2) Revocation—The system should be able to revoke the communication privileges of any client. The time required for the revocation to be completed should be user-configurable. In some embodiments, revocation may only affect new connections, but not existing ones; (3) Parameterized Network Chatter—This system should support a centralized authority that can validate and distribute keys. However, communication with this server may allow for a distributed key to be usable or valid only for some user-configurable or predetermined period of time; (4) Minimal Participant State—Clients may only need to store a small amount of information to communicate. In particular, the state stored by a client should not include per-peer information. All of the above requirements may be met using the systems and methods described herein.

In some embodiments, the following client functions may be used to support the processes and systems of the present invention at a workgroup client. The functions described below may be implemented using software, firmware, hardware (e.g., embedded systems), or any combination of the foregoing. Arguments in the function below may be indicated except for "helper" arguments such as the length field to a buffer. Also, only some notable error codes are mentioned. In other embodiments, additional error codes, arguments, or both, may be used.

1. Function wa_init—This function may return type Error-Code, take clientId as input, and output type ctx. This function may be used to initialize the client-side key distribution service. The ctx variable may be initialized and hold the state on all the keys currently in use, their versions, and other key-specific information. This function may also set up an event thread for handling asynchronous communications. The clientId should be the same identifier given to the WA.

2. Function wa_newKeyId—This function may return type ErrorCode, take types ctx, wgKeyId, waAddress, and privateKey as inputs, and have no output. This function may be used to add a workgroup key ID to the ctx context for managing. waAddress may be the network address for the WA that is responsible for this particular ID. privateKey may be used for encrypting communication with the WA and should be the same key provided to the WA.

3. Function wa_teardown—This function may return type ErrorCode, take type ctx as input, and have no output. This function may be used to tear down all of the states managed by the service and deallocate the memory for the context ctx. This function may also cancel any pending requests (e.g., tickets).

4. Fucntion wa_keyUpToDate_async—This function may return type ErrorCode, take types ctx, wgKeyId, and callback as inputs, and output type Ticket t. This function may be used to check that the workgroup key identified by wgKeyId is up-to-date. There may be no need to specify the version number in some embodiments because the version number may be handled internally by the managing context. This call may be asynchronous and may return immediately. When the event loop receives the response from the server, the event loop may call the callback function. It may then pass to this callback function an error code as well as a status code, although the status code may be meaningful if there was no error. If the client is not authorized to communicate with this workgroup any longer, callback may receive ERROR_WORKGROUP_AUTHORIZATION. If there is no error and the key is still valid, it may receive STATUS_KEY_OK. Otherwise, it may receive STATUS_KEY_STALE. When this function terminates, the ticket t may serve as an identifier for the waiting request listener.

5. Function wa_keyRequest_async—This function may return type ErrorCode, take types ctx, wgKeyId, and callback as inputs and return type Ticket t. This function may be used to refresh the key material and version for this key identifier. A call to this function may be asynchronous and may return immediately. When the event loop receives the response, the event loop may call the callback function. It may pass to this callback function an error code indicating whether the key update was successful or not. If the client is not authorized to communicate with this workgroup any longer, callback may receive ERROR_WORKGROUP_AUTHORIZATION. When this function terminates, the ticket t may serve as an identifier for the waiting request listener.

6. Function wa_keyValidate_async—This function may return type ErrorCode, take ctx, wgKeyId, wgKeyIDVersion, and callback as inputs, and output type Ticket t. This function may be used to validate a key received from another party. This function may update its own key (as per wa_keyRequest_async) as part of the operation. This function may also be asynchronous and may return immediately. When the event loop receives the response, the event loop may call the callback function. It may pass to this callback function an error code indicating whether the key check was successful and a status code indicating the validity of the key. The three possible status codes may include, for example, STATUS_KEY_OK, STATUS_KEY_STALE, and STATUS_KEY_INVALID. If the workgroup key is not one currently managed by the context ctx, this function may return ERROR_UNKNOWN_KEY. This error code may also be passed to the callback function as an optimization.

7. Function wa_currentVersion—This function may return type ErrorCode, take ctx and wgKeyId as inputs, and output version. This function may be used to return the current version as managed by the context ctx for the given workgroup-key ID.

8. Function wa_nextRefresh—This function may return type ErrorCode, take ctx and wgKeyId as inputs and output timeLeft. This function may be used to return the number of seconds remaining before the key should be refreshed. This function may return 0 if the next refresh time has already expired.

9. Function wa_status—This function may return type, take Ticket t as input, and output type status. This function may be used to provide, for example, STATUS_COMPLETE or STATUS_WAITING for the given ticket to status. If the ticket is unknown, this function may return ERROR_UNKNOWN_TICKET.

10. Function wa_timeWaiting—This function may return type ErrorCode, take Ticket t as input, and output seconds. This function may be used to provide the number of seconds that the request has been pending to seconds.

11. Function wa_cancel—This function may return type ErrorCode, take Ticket t as input, and have no output. This function may be used to cancel a pending request.

The above functions are merely illustrative. Many other functions may be defined at a workgroup client for use in distributing and managing workgroup keys in accordance with the present invention. In addition, although some applications of the secure data parser and workgroup management module are described above, it should be clearly understood that the present invention may be integrated with any network application in order to increase security, fault-tolerance, anonymity, or any suitable combination of the foregoing.

Additionally, other combinations, additions, substitutions and modifications will be apparent to the skilled artisan in view of the disclosure herein. For example, although many of the processes illustrated in the figures refer to a client's secret key and/or symmetric key cryptography, a skilled artisan will recognize that a public/private keypair could alternatively be used in a corresponding asymmetric cryptographic scheme.

What is claimed is:

1. A method for secure workgroup communication, the method comprising:
    generating a workgroup key update message for a workgroup, wherein the workgroup key update message includes a workgroup key and a time to live (TTL) value for the workgroup key, and wherein the workgroup includes a plurality of parent nodes and child nodes, each of the child nodes being associated with one or more of the parent nodes;
    encrypting the workgroup key update message using a plurality of public keys associated with the plurality of parent nodes to obtain a plurality of encrypted workgroup key update messages, wherein each of the encrypted workgroup key update messages has been encrypted with a respective one of the plurality of public keys; and
    broadcasting the encrypted workgroup key update messages and an identification of the parent nodes to the workgroup, wherein the identification is usable by the plurality of child nodes to decrypt the encrypted workgroup key update messages.

2. The method of claim 1 wherein encrypting the workgroup key update message comprises encrypting the workgroup key update message using a public-key broadcast encryption scheme.

3. The method of claim 2 wherein encrypting the workgroup key update message using a public-key broadcast encryption scheme comprises:

generating a binary tree of span M, wherein M is the maximum size of the workgroup;

associating the public key of each parent node of the workgroup with a unique leaf of the binary tree;

identifying all parent nodes of the binary tree that are coexistent to or parents of leaves associated with non-revoked child nodes of the workgroup; and encrypting the workgroup key update message under each of the public keys associated with the identified parent nodes.

4. The method of claim 1 wherein the generating the workgroup key update message and broadcasting are performed periodically on a predefined schedule.

5. The method of claim 1 wherein the generating the workgroup key update message and broadcasting are performed automatically in response to the communication privileges of a parent node or child node of the workgroup being revoked.

6. The method of claim 1 wherein broadcasting the encrypted workgroup key update messages to the workgroup comprises posting the encrypted workgroup key update messages to a website.

7. The method of claim 1, wherein encrypting the workgroup key update message comprises generating separate ciphertexts for each of at least a subset of the public keys, wherein each ciphertext comprises the workgroup key update message encrypted using a respective public key.

8. The method of claim 1, wherein the workgroup key comprises a session key used by the parent nodes in the workgroup to encrypt the workgroup communications.

9. The method of claim 1, wherein the workgroup communications comprise one or more key exchange messages for communicating a cryptographic key within the workgroup, and the workgroup key is used to encrypt the cryptographic key.

10. The method of claim 1, wherein the workgroup key update message further includes a timestamp which indicates when the workgroup key was generated.

11. The method of claim 1, wherein each child node is capable of decrypting at least one of the encrypted workgroup key update messages using a public key for a parent node associated with the child node.

12. A system for secure workgroup communication, the system comprising:
a workgroup key server configured to:
generate a workgroup key update message for a workgroup, wherein the workgroup key update message includes a workgroup key and a time to live (TTL) value for the workgroup key, and wherein the workgroup includes a plurality of parent nodes and child nodes, each of the child nodes being associated with one or more of the parent nodes;
encrypt the workgroup key update message using a plurality of public keys associated with the plurality of parent nodes to obtain a plurality of encrypted workgroup key update messages, wherein each of the encrypted workgroup key update messages has been encrypted with a respective one of the plurality of public keys; and
broadcast the encrypted workgroup key update message and an identification of the parent nodes to the workgroup, wherein the identification is usable by the plurality of child nodes to decrypt the encrypted workgroup key update messages.

13. The system of claim 12 wherein the workgroup key server is configured to encrypt the workgroup key update message using a public-key broadcast encryption scheme.

14. The system of claim 12 wherein the workgroup key server is configured to encrypt the workgroup key update message using a public-key broadcast encryption scheme by:
generating a binary tree of span M, wherein M is the maximum size of the workgroup;
associating the public key of each parent node of the workgroup with a unique leaf of the binary tree;
identifying all parent nodes of the binary tree that are coexistent to or parents of leaves associated with non-revoked child nodes of the workgroup; and
encrypting the workgroup key update message under each of the public keys associated with the identified parent nodes.

15. The system of claim 12 wherein the workgroup key server is configured to generate the workgroup key update message and broadcast the encrypted workgroup key update message periodically on a predefined schedule.

16. The system of claim 12 wherein the workgroup key server is configured to generate the workgroup key update message and broadcast the encrypted workgroup key update message automatically in response to the communication privileges of a parent node or child node of the workgroup being revoked.

17. The system of claim 12 wherein the workgroup key server is configured to broadcast the encrypted workgroup key update messages to the workgroup by posting the key update message to a website.

18. The system of claim 12 wherein the workgroup key update message further includes a timestamp which indicates when the workgroup key was generated.

19. The system of claim 12, wherein the workgroup key server is configured to encrypt the workgroup key update message by generating separate ciphertexts for each of at least a subset of the public keys, wherein each ciphertext comprises the workgroup key update message encrypted using a respective public key.

20. The system of claim 12, wherein the workgroup key comprises a session key used by the parent nodes in the workgroup to encrypt the workgroup communications.

21. The system of claim 12, wherein the workgroup communications comprise one or more key exchange messages for communicating a cryptographic key within the workgroup, and the workgroup key is used to encrypt the cryptographic key.

22. The system of claim 12, wherein each child node is capable of decrypting at least one of the encrypted workgroup key update messages using a public key for a parent node associated with the child node.

23. A non-transitory computer-readable medium comprising instructions that, when executed by processing circuitry, cause a computer system to carry out a method for secure workgroup communication, the method comprising:
generating a workgroup key update message for a workgroup, wherein the workgroup key update message includes a workgroup key and a time to live (TTL) value for the workgroup key, and wherein the workgroup includes a plurality of parent nodes and child nodes, each of the child nodes being associated with one or more of the parent nodes;
encrypting the workgroup key update message using a plurality of public keys associated with the plurality of parent nodes to obtain a plurality of encrypted workgroup key update messages, wherein each of the encrypted workgroup key update messages has been encrypted with a respective one of the plurality of public keys; and broadcasting the encrypted workgroup key update message and an identification of the parent nodes to the workgroup, wherein the identification is usable by the plurality of child nodes to decrypt the encrypted workgroup key update messages.

24. The non-transitory computer-readable medium of claim 23, wherein each child node is capable of decrypting at least one of the encrypted workgroup key update messages using a public key for a parent node associated with the child node.

* * * * *